US008822865B2

(12) United States Patent
Hwang et al.

(10) Patent No.: US 8,822,865 B2
(45) Date of Patent: Sep. 2, 2014

(54) TOUCH SCREEN AND METHOD FOR MANUFACTURING THE SAME

(75) Inventors: Ji Young Hwang, Daejeon (KR); In-Seok Hwang, Daejeon (KR); Seung Heon Lee, Daejeon (KR); Sang Ki Chun, Daejeon (KR); Hyun Sik Kim, Daejeon (KR); Yong Goo Son, Daejeon (KR); Beom Mo Koo, Daejeon (KR); Mi Kyoung Kim, Daejeon (KR); Joonhyung Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 153 days.

(21) Appl. No.: 13/338,680

(22) Filed: Dec. 28, 2011

(65) Prior Publication Data

US 2012/0234663 A1 Sep. 20, 2012

(30) Foreign Application Priority Data

Dec. 29, 2010 (KR) .................. 10-2010-0138132

(51) Int. Cl.
   *H03K 17/975* (2006.01)
(52) U.S. Cl.
   USPC .......................................... 200/600; 345/174
(58) Field of Classification Search
   USPC ................................................... 200/600
   See application file for complete search history.

(56) References Cited

U.S. PATENT DOCUMENTS

| | | | |
|---|---|---|---|
| 8,217,902 B2* | 7/2012 | Chang et al. | 345/173 |
| 8,274,486 B2* | 9/2012 | Barbier et al. | 345/173 |
| 8,581,875 B2* | 11/2013 | Wu et al. | 345/173 |
| 2005/0030048 A1* | 2/2005 | Bolender et al. | 324/661 |
| 2008/0277259 A1* | 11/2008 | Chang | 200/600 |
| 2008/0316182 A1 | 12/2008 | Antila et al. | |
| 2010/0182249 A1 | 7/2010 | Kang et al. | |
| 2012/0056664 A1 | 3/2012 | Nam | |

FOREIGN PATENT DOCUMENTS

| | | |
|---|---|---|
| KR | 10-2010-0022059 A | 2/2010 |
| KR | 10-0944519 B1 | 2/2010 |
| KR | 10-2010-0084250 A | 7/2010 |

* cited by examiner

*Primary Examiner* — Kyung Lee
(74) *Attorney, Agent, or Firm* — McKenna, Long & Aldridge LLP

(57) ABSTRACT

Provided are a single-sided one-sheet type capacitive touch screen and a method for manufacturing the same. The touch screen includes: a substrate; a first conductive pattern disposed on the substrate in a vertical direction and including at least two pattern columns having two or more conductive pattern regions electrically connected with each other; a second conductive pattern disposed on the same surface of the substrate as the surface where the first conductive pattern is disposed, not being electrically connected with the first conductive pattern, and including two or more conductive pattern regions not electrically connected with each other; a transparent conductive bridge electrically connecting the conductive pattern regions of the second conductive pattern in a horizontal direction; and a transparent insulating part disposed between the transparent conductive bridge and the first conductive pattern to electrically insulate the transparent conductive bridge and the first conductive pattern.

29 Claims, 18 Drawing Sheets

TOUCH SCREEN AND METHOD FOR MANUFACTURING THE SAME

TECHNICAL FIELD

This application claims priority to Korean Patent Application No. 10-2010-0138132, filed Dec. 29, 2010, which is incorporated herein by reference in its entirety.

The present invention relates to a touch screen and a method for manufacturing the same. More particularly, the present invention relates to a one-sheet type touch screen and a method for manufacturing the same.

BACKGROUND ART

In general, a touch screen is configured by forming conductive patterns on upper and lower substrates, respectively and bonding the upper and lower substrates with an insulating layer interposed therebetween. An ITO-based conductive film is mainly used as the conductive pattern, but the ITO has a low recognition speed due to self-RC delay when being applied to a large-area touch panel.

In order to solve the problem, an introduction of an additional compensating chip is attempted, but there is a problem in that a cost thereof is increased.

Accordingly, a lot of attempts to replace the ITO pattern with a conductive pattern have been done, but there are problems in that in the case of using a conductive pattern, it is difficult to form a fine pattern unperceived and having high precision in view of visibility and in the case of using a photolithography method, the process becomes very complicated and a process cost becomes very high.

DETAILED DESCRIPTION OF THE INVENTION

Technical Problem

The present invention has been made in an effort to provide a touch screen that has excellent performance and can be easily manufactured and a method for manufacturing the same.

Technical Solution

An exemplary embodiment of the present invention provides a single-sided one-sheet type capacitive touch screen, comprising:

a substrate;

a first conductive pattern disposed on the substrate in a vertical direction and comprising at least two pattern columns having two or more conductive pattern regions electrically connected with each other;

a second conductive pattern which is disposed on the same surface as the surface where the first conductive pattern is disposed, is not electrically connected with the first conductive pattern, and comprises two or more conductive pattern regions not electrically connected with each other;

a transparent conductive bridge electrically connecting the conductive pattern regions of the second conductive pattern in a horizontal direction; and a transparent insulating part disposed between the transparent conductive bridge and the first conductive pattern to electrically insulate the transparent conductive bridge and the first conductive pattern.

Another exemplary embodiment of the present invention provides a single-sided one-sheet type capacitive touch screen, comprising:

a substrate;

a first conductive pattern disposed on the substrate in a vertical direction and comprising at least two pattern columns having electrically connected metal lines;

a second conductive pattern which is disposed on the same surface as the surface where the first conductive pattern is disposed, is not electrically connected with the first conductive pattern, and comprises two or more metal lines not electrically connected with each other;

a transparent conductive bridge electrically connecting the metal lines of the second conductive pattern in a horizontal direction; and a transparent insulating part disposed between the transparent conductive bridge and the first conductive pattern to electrically insulate the transparent conductive bridge and the first conductive pattern.

Yet another exemplary embodiment of the present invention provides a method for manufacturing a single-sided one-sheet type capacitive touch screen, comprising:

forming a first conductive pattern disposed on a substrate in a vertical direction and comprising at least two pattern columns having two or more conductive pattern regions electrically connected with each other;

forming a second conductive pattern which is disposed on the same surface as the surface where the first conductive pattern is disposed, is not electrically connected with the first conductive pattern, and comprises two or more conductive pattern regions not electrically connected with each other;

forming a transparent insulating part at a portion electrically connected with the first conductive pattern when electrically connecting the conductive pattern regions of the second conductive pattern in a horizontal direction; and forming a transparent conductive bridge electrically connecting the conductive pattern regions of the second conductive pattern in a horizontal direction.

Advantageous Effects

According to the exemplary embodiments of the present invention, a single-sided one-sheet type touch screen can be provided, such that a thickness of the touch screen can be minimized and since all the conductive patterns are formed on a single side, a manufacturing method can be easy. Further, since the touch screen is a one sheet type, it is advantageous in that a lamination is not required as compared with the related art which forms the touch screen by using two or more sheets of substrates. Further, since the first conductive pattern and the second conductive pattern are disposed on the same surface, installation and attachment of an FPCB are easy. Further, since the touch screen is a one sheet type, the light transmittance is excellent as compared with a two-sheet type. Further, when a functional surface film is laminated on the surface of the touch screen, a process is not large, such that bubbles are not filled.

EXPLANATION OF REFERENCE NUMERALS AND SYMBOLS

Figure 1:
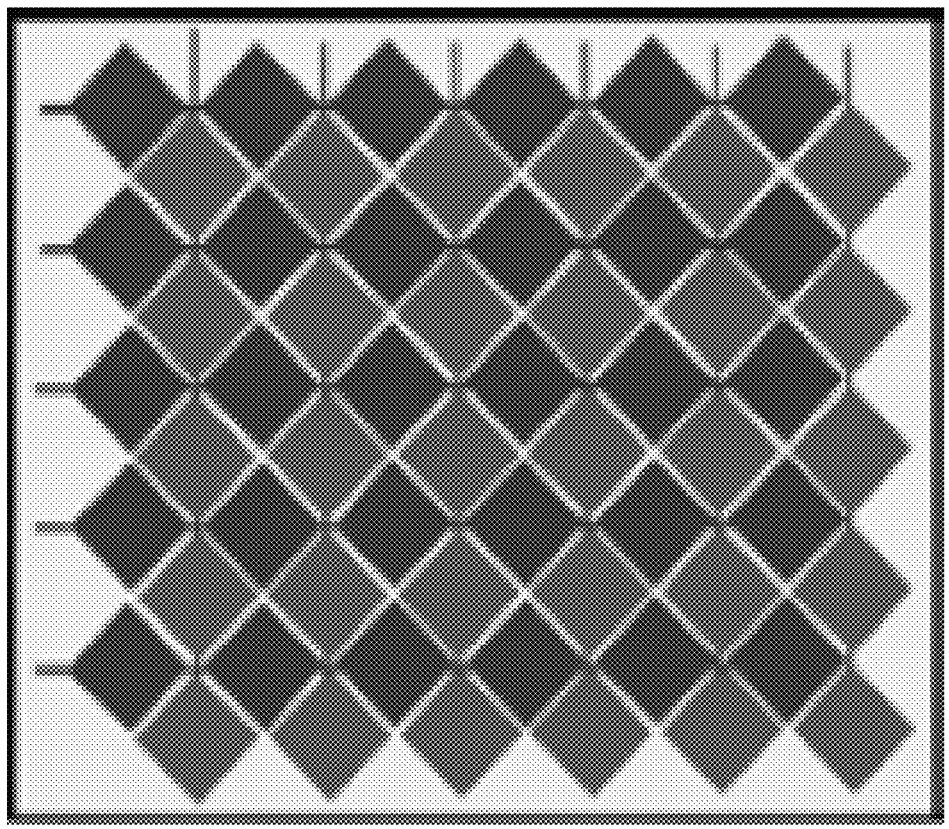
FIG. 1 is an exemplified diagram illustrating a layout of a conductive pattern of a touch screen according to an exemplary embodiment of the present invention.

10: Substrate
20: First conductive pattern
30: Second conductive pattern
40: Transparent insulating part
50: Transparent conductive bridge
60: Metal line of first conductive pattern
70: Metal line of second conductive pattern

BEST MODE

Hereinafter, the present invention will be described in detail.

The present inventors found out a method of forming two or more conductive patterns which are insulated from each other on a single side of one sheet of substrate and the fact that a single-sided one-sheet type touch screen may be manufactured by using the same. Accordingly, the present invention provides a single-sided one-sheet type touch screen and a method for manufacturing the same.

In this specification, a vertical direction and a horizontal direction are expressions for representing a relative direction, and if any one direction is determined, the other direction may be determined with respect to the determined direction. This is because when the touch screen is rotated, the vertical direction and the horizontal direction are not absolute. For example, the vertical direction may mean a horizontal direction, a vertical direction, a diagonal direction, or directions having other predetermined angles. The vertical direction and the horizontal direction do not need to form a right angle and may form an allowable angle in the art. For example, an angle between the vertical direction and the horizontal direction may be 80 to 100 degrees.

In this specification, the expression of a conductive pattern means to have conductivity and form a pattern shape of a predetermined form, not a front side layer. The conductive pattern may comprise two or more conductive pattern regions, which is described below, and comprise two or more pattern columns configured by the two or more conductive pattern regions. In the present invention, a metallic pattern may be applied as the conductive pattern. Herein, it is interpreted that the metallic pattern may be made of only metal, and further, may be a pattern comprising an additive in addition to the metal.

In this specification, the conductive pattern region means a region where the above-mentioned conductive patterns having a predetermined area are formed.

In this specification, the conductive pattern region means that the patterns having the predetermined area are arranged in any one direction. Herein, the patterns having the predetermined area does not need to be arranged in a straight line and may be arranged in a predetermined direction so as to be electrically connected to each other directly or by a transparent conductive bridge.

In this specification, the transparence means that light transmittance is 50% or more, preferably 75% or more, and more preferably 85% or more.

A capacitive touch screen according to the present invention is a single-sided one-sheet type and comprises the following constituent elements.

1) a substrate;
2) a first conductive pattern disposed on the substrate in a vertical direction and comprising at least two pattern columns having two or more conductive pattern regions electrically connected with each other;
3) a second conductive pattern which is disposed on the same surface as the surface where the first conductive pattern is disposed, is not electrically connected with the first conductive pattern, and comprises two or more conductive pattern regions not electrically connected with each other;
4) a transparent conductive bridge electrically connecting the conductive pattern regions of the second conductive pattern in a horizontal direction; and
5) a transparent insulating part disposed between the transparent conductive bridge and the first conductive pattern to electrically insulate the transparent conductive bridge and the first conductive pattern.

FIG. 1 is an exemplified diagram illustrating a layout of a conductive pattern of a touch screen according to an exemplary embodiment of the present invention. Referring to FIG. 1, a portion represented in red is the first conductive pattern, a portion represented in blue is the second conductive pattern, and each conductive pattern region has a diamond form. Referring to FIG. 1, the conducive pattern regions comprised in the first conductive pattern and the second conductive pattern are shown in the diamond forms, but do not necessarily have the diamond form and may be configured in various forms within the scope to satisfy the aforementioned configuration of the present invention.

Figure 2:
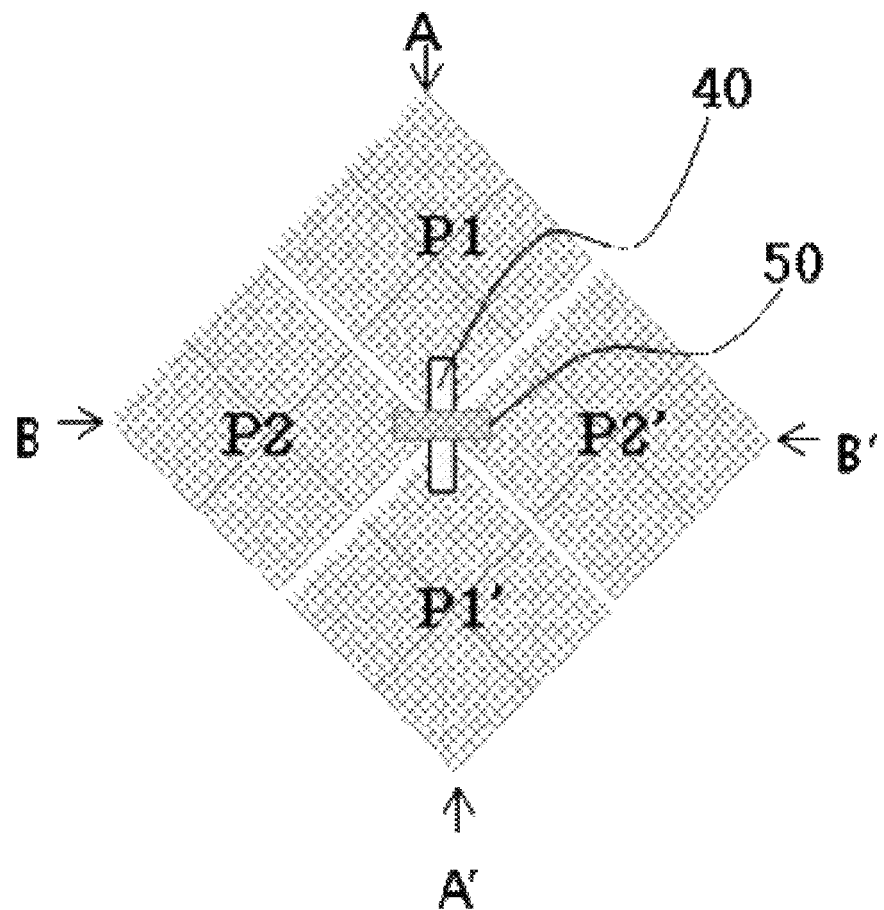
FIG. 2 is a partial enlarged view illustrating a layout of a conductive pattern of a touch screen according to an exemplary embodiment of the present invention.

An enlarged view of the layout state of the conductive pattern shown in FIG. 1 is exemplified in FIG. 2. FIG. 2 shows a conductive pattern configured by a first conductive pattern comprising two conductive pattern regions and a second conductive pattern comprising two conductive pattern regions. For convenience, the conductive pattern will be described based on the configuration of FIG. 2, but the first conductive pattern and the second conductive pattern may comprise two or more conductive pattern regions, respectively, as shown in FIG. 1, and the conductive pattern regions may be electrically connected with each other in a method described in FIG. 2.

Figure 3:
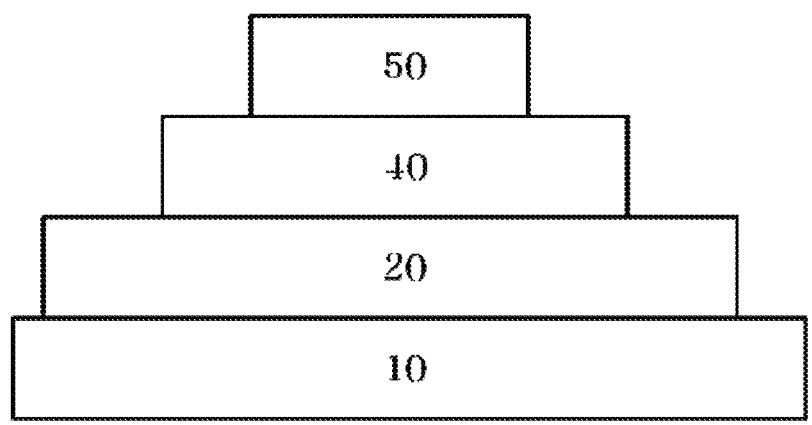
FIG. 3 is a cross-sectional view taken along line A-A' of FIG. 2.
Figure 4:
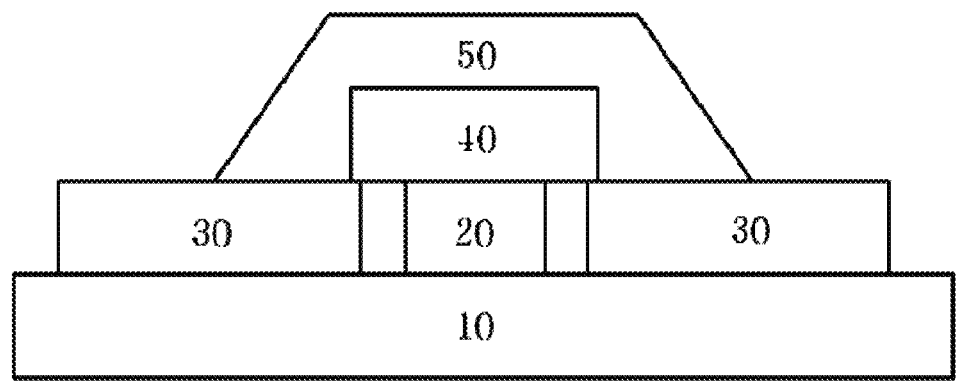
FIG. 4 is a cross-sectional view taken along line B-B' of FIG. 2.
Figure 5:
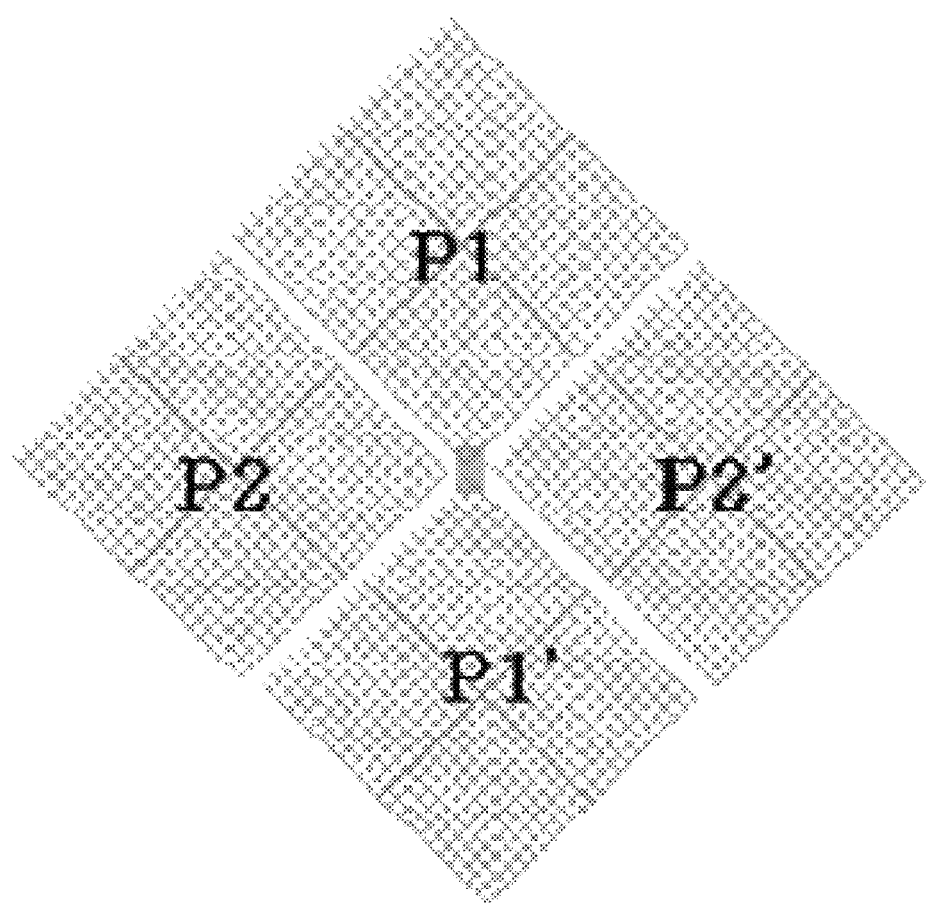
FIG. 5 is a diagram showing upper surfaces of first conductive patterns P1 and P1' and second conductive patterns P2 and P2'.
Figure 6:
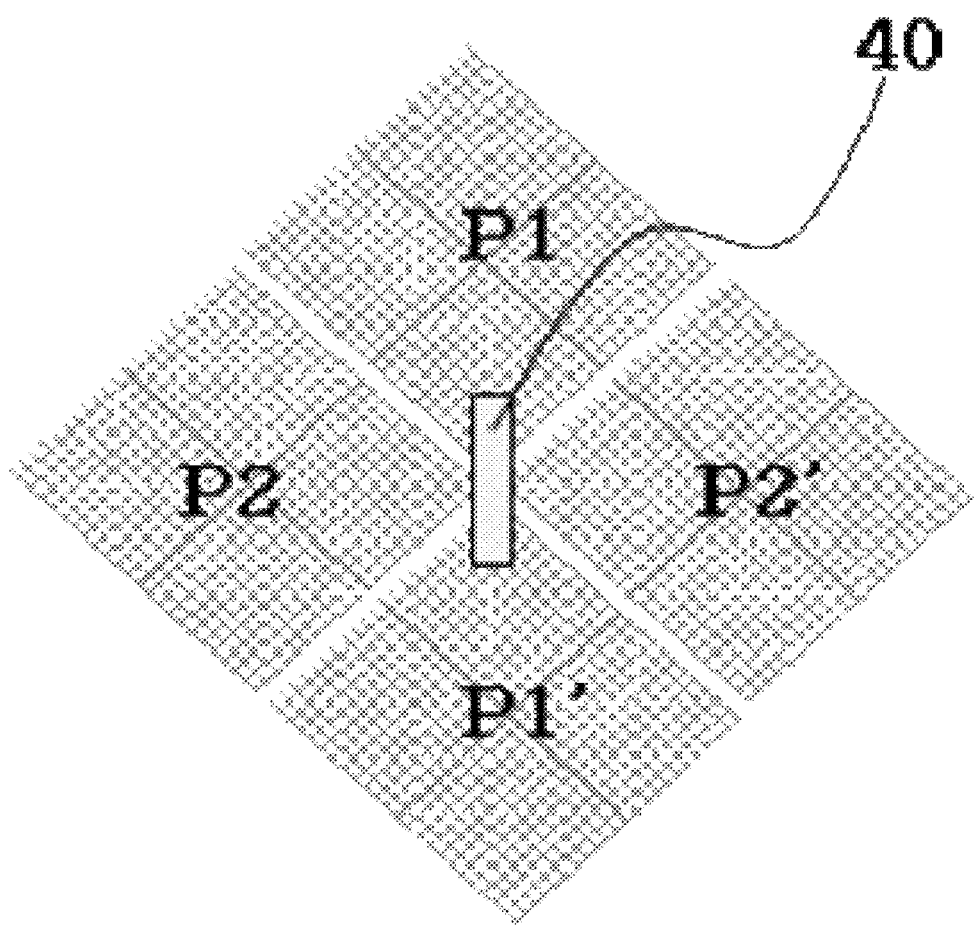
FIG. 6 is a diagram showing a state where a transparent insulating part is formed on the surfaces where first conductive patterns P1 and P1' and second conductive patterns P2 and P2' are formed.

Referring to FIG. 2, two conductive pattern regions P1 and P1' comprised in the first conductive pattern are electrically connected with each other. FIGS. 3 and 4 are cross-sectional views taken along lines A-A' and B-B' of FIG. 2, respectively. In FIGS. 3 and 4, for convenience, pattern forms of the first and second conductive patterns are not shown, but the first and second conductive patterns have the pattern forms. FIG. 5 shows the top of the surface where first conductive patterns P1 and P1' and second conductive patterns P2 and P2' are formed. FIG. 6 shows a state where a transparent insulating part is formed on the surfaces where first conductive patterns P1 and P1' and second conductive patterns P2 and P2' are formed.

Referring to FIGS. 4 and 5, it can be seen that the two conductive pattern regions P1 and P1' of the first conductive pattern are electrically connected with each other. Meanwhile, the two conductive pattern regions P2 and P2' comprised in the second conductive pattern are not electrically connected with each other. This is because if the conductive pattern regions P2 and P2' are electrically connected with each other, the conductive pattern regions P2 and P2' are contacted with the first conductive pattern. As a result, as shown in FIG. 6, when the two conductive pattern regions P2 and P2' comprised in the second conductive pattern are electrically connected with each other, a transparent insulating part is provided in a region expected to be contacted with the first conductive pattern. In addition, as shown in FIG. 2, a transparent conductive bridge is formed on the transparent insulating part to electrically connect the two conductive pattern regions P2 and P2' of the second conductive pattern.

FIG. 3 is a cross-sectional view taken along line A-A' of FIG. 2. Referring to FIG. 3, the transparent insulating part is provided on the first conductive pattern and the conductive pattern regions of the second conductive pattern are electrically connected with each other by the transparent conductive bridge formed on the transparent insulating part. In this case, a width of the transparent insulating part is not particularly limited so long as the transparent conductive bridge and the first conductive pattern could be insulated from each other by the transparent insulating part. Similarly, a length, a thickness, and a shape of the transparent conductive bridge are not particularly limited so long as the conductive pattern regions comprised in the second conductive pattern could be electrically connected with each other.

In the present invention, shapes, thicknesses, widths, and the like of the transparent insulating part and the transparent conductive bridge are not particularly limited. For example, when the transparent conductive bridge is a square, a length of the transparent insulating part may be smaller than that of the transparent conductive bridge with respect to a connection direction of the transparent conductive bridge electrically connecting the two conductive pattern regions of the second conductive pattern and a width of the transparent insulating part may be larger than that of the transparent conductive bridge with respect to the connection direction of the electrically-connected first conductive pattern for electrical insulation.

Figure 7:
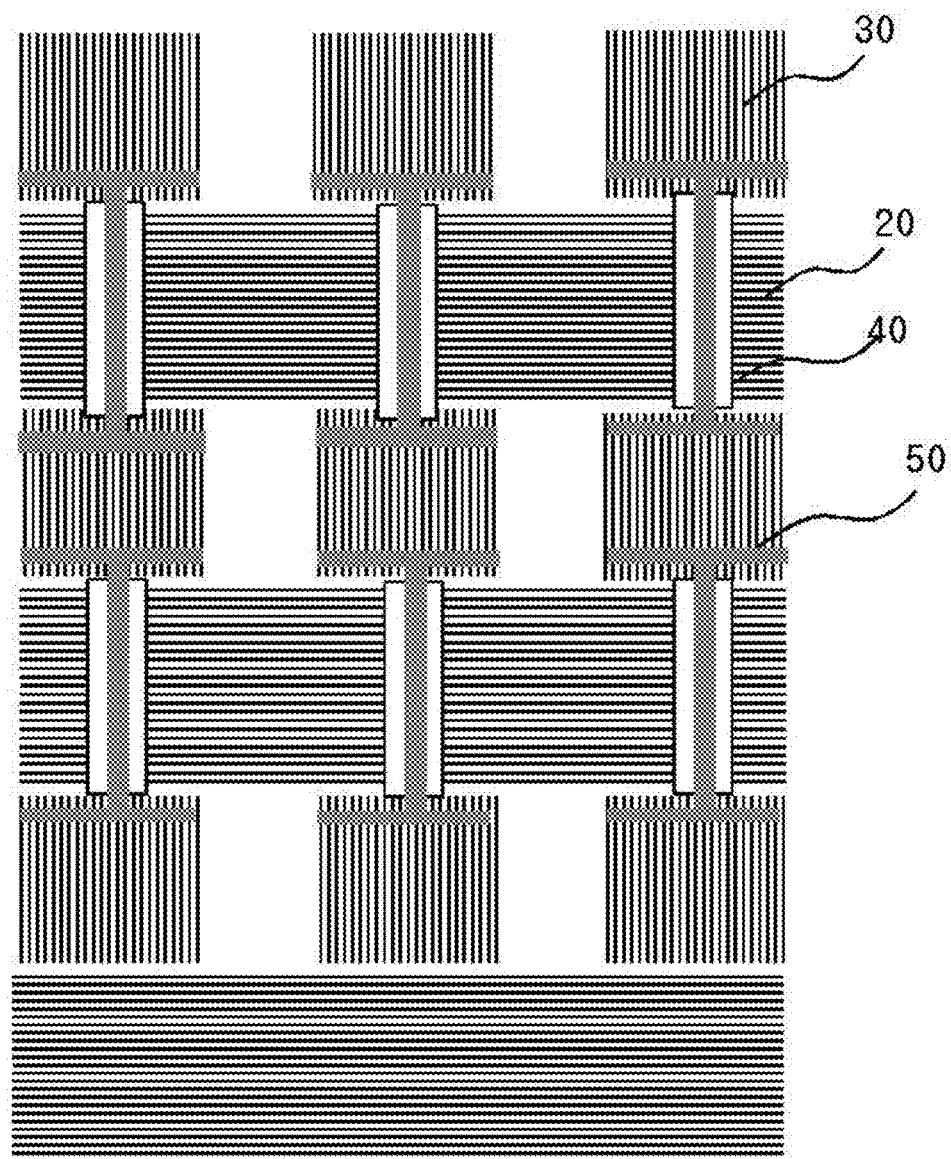
FIGS. 7 and 8 are exemplified diagrams illustrating a layout state of conductive patterns, a transparent insulating part, and a transparent conductive bridge of a touch screen according to an exemplary embodiment of the present invention.
Figure 8:
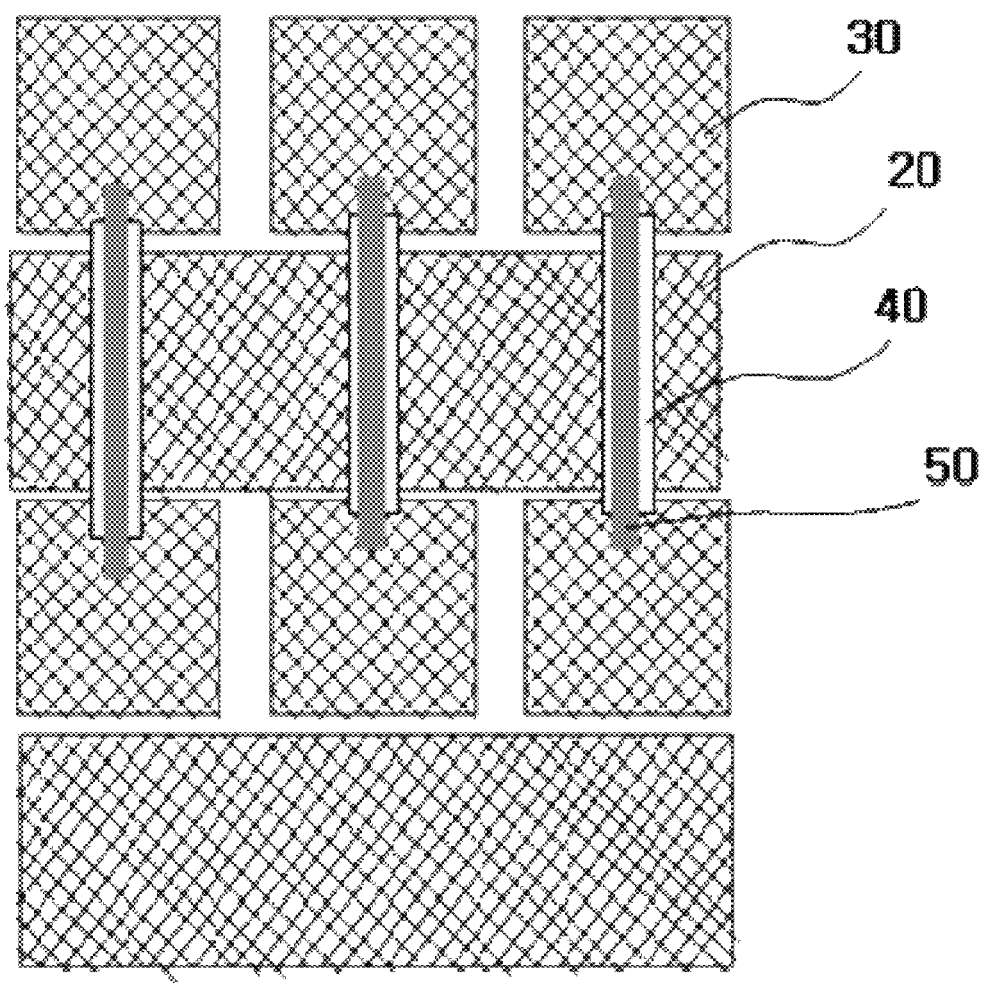

In the touch screen according to the exemplary embodiment of the present invention, the first conductive pattern, the second conductive pattern, the transparent insulating part, and the transparent conductive bridge are not limited thereto and for example, may also have structures shown in FIGS. 7 and 8. However, in order to overcome visibility and an optical phenomenon such as a moire, a structure of FIG. 1 or 8 is more preferable than the structure of FIG. 7.

An angle between the pattern column of the first conductive pattern and the pattern column of the second conductive pattern is not particularly limited so long as the touch screen can be driven, but may be 80 to 100 degrees or 90 degrees.

In the present invention, the entire conductive pattern comprising the first conductive pattern and the second conductive pattern is designed and the conductive pattern may be formed on the substrate according to the designed pattern. In order to form the conductive pattern, an etching method using an etching resist, a printing method, a photolithography method, a photography method, a mask method, a sputtering method, an inkjet method, or the like may be used. Among the methods, the etching method using the etching resist is preferable in order to form a fine pattern. In the etching method using the etching resist, the etching resist may be formed by using the photolithography method. However, since the photolithography method has high process costs, it is preferred that the etching resist is formed by the printing method.

For example, in the exemplary embodiment of the present invention, the conductive pattern may be formed by a method comprising a) forming a conducting layer on a substrate, b) forming an etching resist pattern on the conducting layer, and c) forming a conductive pattern by etching the conducting layer using the etching resist pattern.

In process c), the conductive pattern having a line width smaller than a width of the etching resist pattern may be formed by over-etching the conducting layer.

After process c), the method may further comprise d) removing the etching resist pattern; or e) reforming the etching resist pattern so as to cover the conductive pattern.

Figure 9:
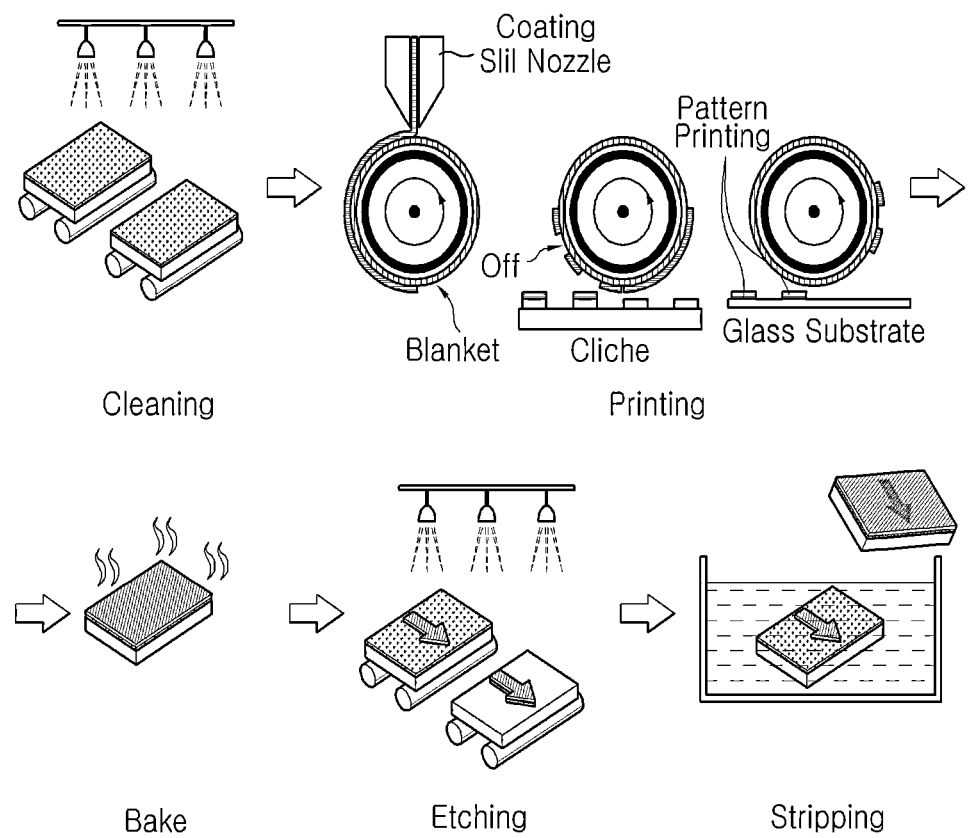
FIGS. 9 to 13 are schematic diagrams exemplifying a process for forming conductive patterns of a touch screen according to the present invention.
Figure 10:
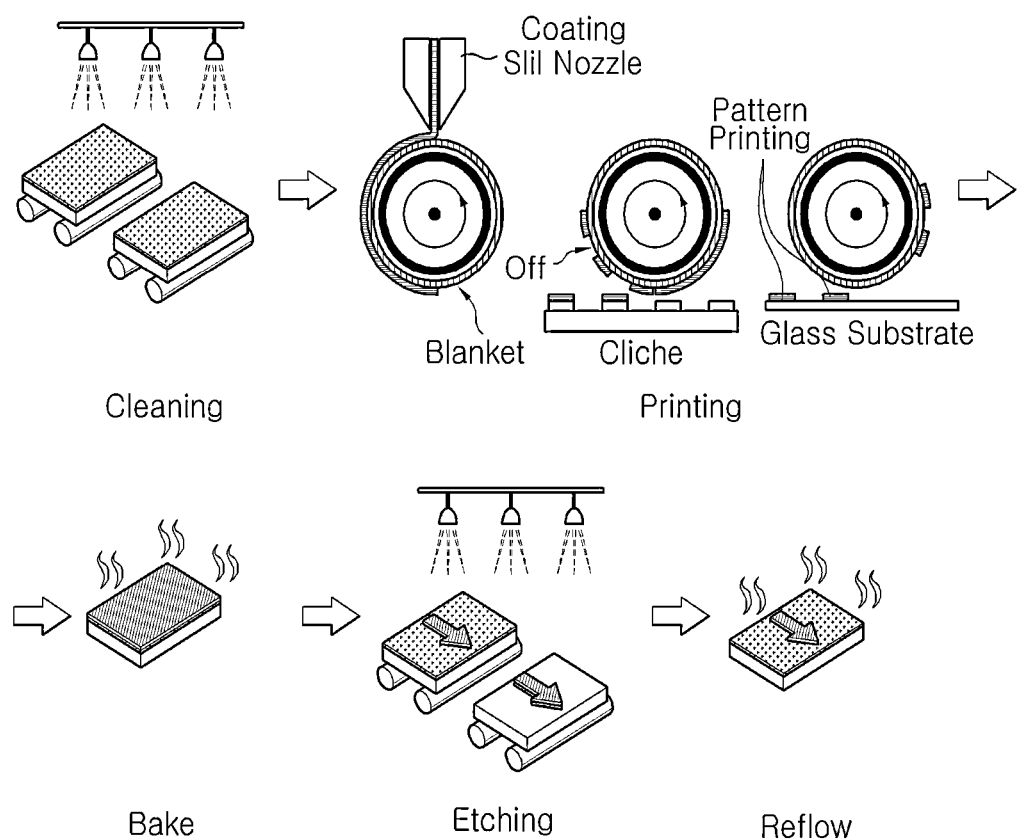
Figure 11:
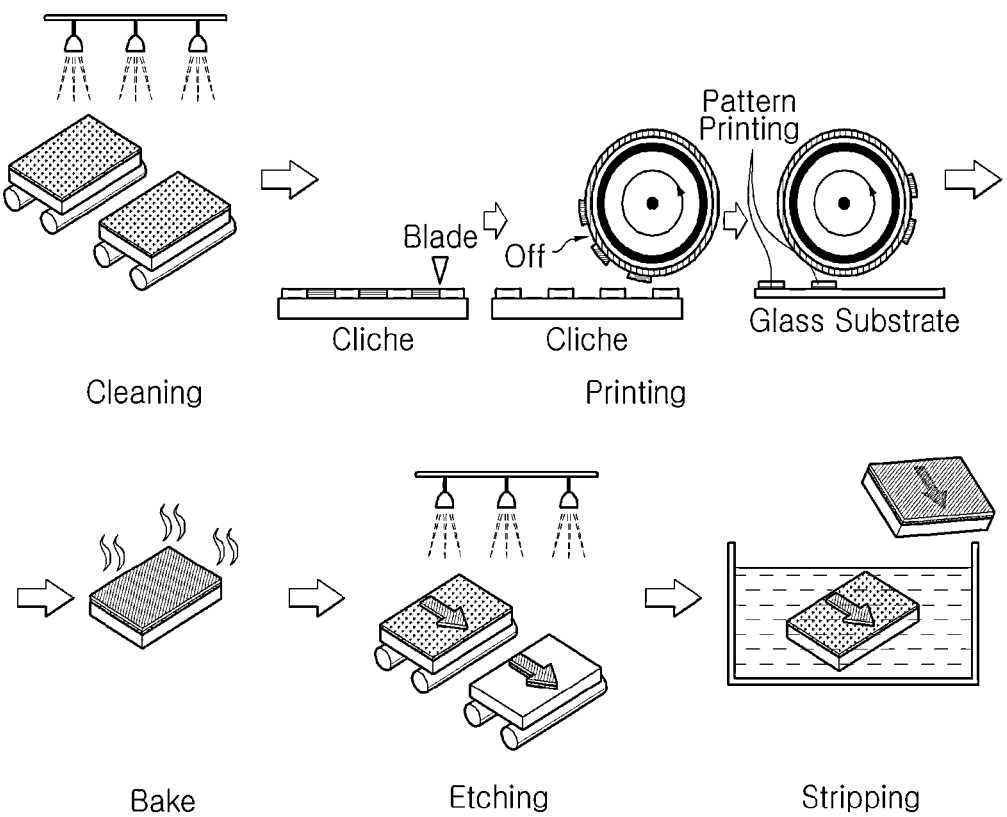
Figure 12:
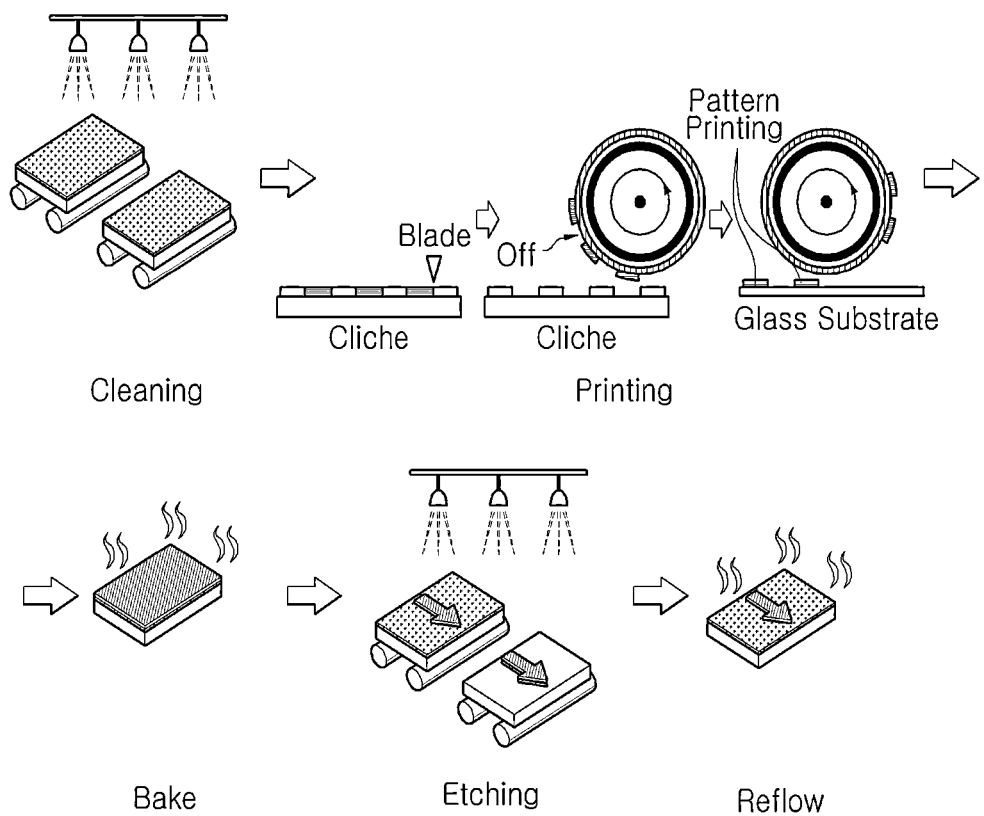

An example using process d) is shown in FIGS. 9 and 11 and an example using process e) is shown in FIGS. 10 and 12, but the scope of the present invention is not limited to the processes shown in the drawings and some processes among the processes disclosed in FIGS. 9 to 12 may be omitted or added, if necessary.

A material of the substrate may be appropriately selected according to a field desired to apply a method for manufacturing the conductive pattern according to the exemplary embodiment of the present invention, and particular examples thereof comprise a glass or inorganic material substrate, a plastic substrate or film, other flexible substrates, or the like, but are not limited thereto. As the plastic substrate or film, a material known in the art may be used, and for example, may be a film having the visible-light transmittance of 80% or more such as polyethylene terephthalate (PET), polyvinylbutyral (PVB), polyethylene naphthalate (PEN), polyethersulfon (PES), polycarbonate (PC), and acetyl cellulose. A thickness of the plastic film may be 12.5 to 500 micrometers or 50 to 250 micrometers. In the present invention, the conducting layer may be directly formed on tempered glass and may be attached to tempered glass after being formed on glass or a film.

Further, a material of the conducting layer is not particularly limited, but may use a metallic film. Particular examples of the material of the conducting layer may comprise a single layer or a multilayer comprising silver, aluminum, copper, neodymium, molybdenum, or an alloy thereof. Herein, a thickness of the conducting layer is not particularly limited, but may be 0.01 to 10 micrometers and preferably 500 nm or less in view of conductivity and economical efficiency of a formation process of the conducting layer.

A forming method of the conducting layer is not particularly limited and may use the methods such as depositing, sputtering, wet coating, evaporating, electrolytic plating or electroless plating, laminating of a metal thin film. Particularly, the forming method of the conducting layer may use a method in which conductivity is given by sintering and/or drying after coating organic metal, nano metal, or a complex solution thereof on the substrate. Organic silver may be used as the organic metal and nano silver particles and the like may be used as the nano metal.

Before forming the conducting layer, a buffer layer for improving an adhesive force may be further formed on the substrate.

After process a), a cleaning process may be further comprised.

In process b), a method of forming the etching resist pattern may use a printing method, a photolithography method, a photography method, a mask method, or a laser transfer method, for example, a thermal transfer imaging method, but may use the printing method or the photolithography method in order to precisely implement a fine pattern and may use the printing method in view of process costs.

The printing method may be performed by transferring a paste or ink comprising an etching resist material on the substrate with the conducting layer in a desired pattern form and then, drying or curing. The transfer method is not particularly limited, but the desired pattern may be transferred on the conducting layer by forming the pattern on a pattern transfer medium such as an intaglio or a screen and using the formed pattern. A method of forming the pattern form on the pattern transfer medium may use a known method in the art.

The printing method is not particularly limited and may use a printing method such as a gravure offset printing, a reverse offset printing, a screen printing, a gravure printing, or the like, but preferably the reverse offset printing method or the gravure offset printing method and more preferably the reverse offset printing method in order to form a pattern having a fine line width.

Figure 13:
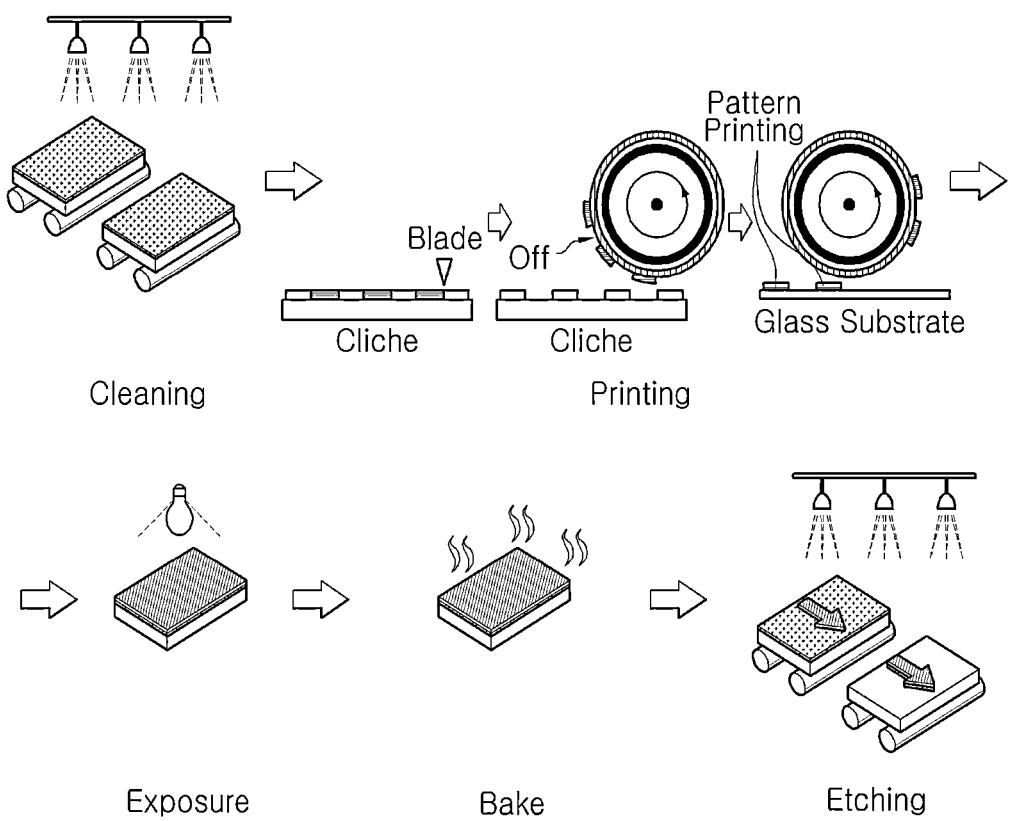

The reverse offset printing may be performed by coating a paste on a roll type blanket and then pressing the coated paste and a cliche having an unevenness to form a desired pattern on the blanket and transferring the pattern formed on the blanket to the conducting layer. The printing method is shown in FIGS. 9 and 10. Further, the gravure offset printing may be performed by filling a paste in an intaglio with the engraved pattern and then primarily transferring the intaglio with a silicon rubber called a blanket and pressing and secondarily transferring the substrate with the blanket and the conducting layer. The printing method is shown in FIGS. 11 to 13. However, the methods according to exemplary embodiments of the present invention are exemplified in FIGS. 9 to 13 and the scope of the present invention is not limited thereto. Some processes among the processes described in FIGS. 9 to 13 may be omitted or added as necessary.

In the case of the gravure offset printing method or the reverse offset printing method, since the ink or paste is almost transferred to the substrate with the conducting layer due to a releasing property of the blanket, a separate blanket cleaning process is not required. The intaglio may be fabricated by precisely etching the substrate. The intaglio may be fabricated by etching a metal plate or may be fabricated through an optical patterning with a polymer resin.

In the case of using the reverse offset printing method, viscosity of printing ink containing the material of the etching resist pattern may be more than 0 cps and 1,000 cps or less and may be 5 cps to 10 cps. Further, in the case of using the gravure printing method, the viscosity of the ink may be 6,000 cps to 12,000 cps and in the range of 7,000 cps to 8,000 cps. When the viscosity of the ink is in the range, stability of ink (process maintaining ability of ink) during the process may be maintained while the coating of the ink is properly performed in each printing method.

When the etching resist pattern is reformed so as to cover the conductive pattern after etching the conducting layer by using the etching resist pattern as a mask, the etching resist pattern material may have an insulating property. Further, in process e), a polymer material having acid resistance in addition to mobility by a condition used during the reforming of the etching resist pattern, for example, a treatment of heat, a solvent, vapor (vapor of the solvent), plasma, or the like may be used and a polymer material having cross-linking may be used.

The etching resist material may have an insulating property of leakage current of $10^{-1}$ ampere or less. The leakage current of the etching resist material may be $10^{-16}$ ampere or more. The etching resist material may have acid resistance against an etchant of the conducting layer used in the corresponding method, and for example, may not change for 10 minutes or more during contacting with the etchant of the corresponding conducting layer by an immersing or spraying method.

Further, the etching resist material may have mobility in a processing condition for process e) described below. In detail, a polymer material having plasticity or curability may be used as the etching resist material. In the present invention, a thermosetting resin and a UV curable resin may be used as the etching resist material. The UV curable resin may not use the solvent unlike the thermosetting resin and thus is advantageous in forming a fine pattern of a stable form because there is no problem due to solvent evaporation. FIG. 9 shows a case where the etching resist pattern is fabricated by using the UV curable resin.

In detail, Examples of the etching resist material may comprise an imide-based polymer, a bisphenol-based polymer, an epoxy-based polymer, an acryl-based polymer, an ester-based polymer, a novolac-based polymer, or a a mixture thereof. Among them, the acryl-based, imide-based, or novolac-based resins are preferable. Further, Examples of the etching resist material may comprise a mixture or a copolymer configured by two or more of an imide-based monomer, a bisphenol-based monomer, an epoxy-based monomer, an acryl-based monomer, and an ester-based monomer, for example, an epoxized acryl resin or a copolymer of epoxy and acryl-based monomers.

Examples of the solvent added in the etching resin pattern composition may comprise a solvent used in the art and a solvent may be used either alone or in combination of two or more thereof. For example, a blanket material used in the printing method is not particularly limited as long as a solvent does not damage PDMS, and for example, may comprise propylene glycol methyl ether acetate (PGMEA), ethanol, propylene carbonate, butyl cellosolve, dimethyl acetamide (DMAc), methyl ethyl ketone (MEK), methyl isobutyl ketone (MIBK), or the like.

The composition for forming the etching resist pattern may further comprise an adhesion promoter, a surfactant, and the like.

In process c), the forming of the conductive pattern is performed by etching the conducting layer by using the etching resist pattern as a mask.

The etching method may be a wet etching using an etchant or a dry etching using plasma or laser, but is not limited thereto.

In the case of using the wet etching, a nitric acid ($HNO_3$) solution, a mixed acid solution of phosphoric acid/nitric acid/acetic acid, one or two or more of hydrogen peroxide, perchloric acid, hydrochloric acid, hydrofluoric acid, and oxalic acid or an aqueous solution thereof may be used as the etchant. If necessary, the etchant may further comprise an additive and other atoms for etching a desired conducting layer, but the etchant is not limited thereto and an etchant known as etching solutions of the corresponding conducting layer may be used.

In process c), in the case of performing over-etching when etching the conducting layer, an undercut is formed below an edge of the etching resist pattern.

In the present invention, the conductive pattern having a line width thinner than the line width of the etching resist pattern may be acquired by etching the conducting layer so that the undercut is formed below the etching resist pattern.

In process c), the line width of the conductive pattern may be controlled according to an etching time for forming the conductive pattern. The longer the etching time is, the thinner the line width of the conductive pattern may be formed.

In the present invention, the etching time for forming the conductive pattern may vary according to conditions such as a kind and concentration of the etchant used to form the conductive pattern, a kind of the conducting layer, an etching temperature, and the like. For example, the etching time may be a just-etching time to a time longer than the just-etching time by 2,000%, may be a time longer than the just-etching time by 1% to 1,000%, may be a time longer than the just-etching time by 1% to 500%, and may be a time longer than the just-etching time by 5% to 100%. Herein, the just-etching time means a time required to etch a pattern in the same form as a mask form.

The etching temperature of the conducting layer may also vary according to conditions such as a kind and concentration of the etchant used to pattern the conducting layer, a kind of the conducting layer, an etching temperature, and the like, and for example, may be room temperature to 80 degrees and may be 30 degrees to 70 degrees.

The etching method may be a deep etching method, a spray method, or the like, but more preferably the spray method for a uniform etching.

When the conducting layer is a multilayer, an etchant for etching the multilayer at almost the same speed at the same time may be used.

After the conducting layer is etched by using the etching resist pattern as a mask, the etching resist pattern may be removed, as in process d), but the etching resist pattern is not removed to be used for a touch screen as it is. Further, as in process e), the etching resist pattern may be reformed so as to cover the conductive pattern.

In process d), the removing of the etching resist pattern may use a known method in the art according to a kind of an etching resist pattern material.

In process e), the term "covering" means that the conducting layer is insulated from the outside while the etching resist pattern is changed and reflows to be adhered to the side of the conductive pattern and the substrate. Further, in the present invention, the term "reforming", as a term defined in this specification, means that the etching resist pattern has mobility and the form thereof is changed to cover the conductive pattern therebelow.

In process e), the reforming of the etching resist pattern may use a chemical phenomenon in which the etching resist pattern is cured by an additional treatment of heat or plasma or a removal of the solvent after the etching resist pattern has the mobility to be deformed by a treatment of, for example, heat, the solvent, vapor thereof (vapor of the solvent), plasma, or the like. Further, the deformation may be physically caused by applying a pressure to the etching resist pattern.

The reforming of the etching resist pattern may use heat or a solvent (or vapor of the solvent) and in this case, as described above, a plastic or thermosetting polymer material may be used as an etching resist pattern material.

When the etching resist pattern is reformed by using heat, a method may be used in which the etching resist pattern material has mobility by applying the heat to sink to a space between the substrate and the etching resist pattern and then the material is cured by further applying the heat not to have the mobility. In this case, a heating temperature may be properly selected by those skilled in the art according to the etching resist pattern material.

Further, when the etching resist pattern is reformed by using a solvent or vapor of the solvent, the etching resist pattern may be exposed in a fume atmosphere of the solvent (solvent annealing). As a result, when the etching resist pattern material reacts with the solvent, the etching resist pattern material has the mobility and as a result, the etching resist pattern is deformed to be contacted with the substrate. Subsequently, when the solvent is removed by heating the solvent at a predetermined temperature enough to dry the solvent the reforming method in which the etching resist pattern material is cured and does not have the mobility may be used. In this case, the solvent may be appropriately selected by those skilled in the art according to an etching resist pattern material and the etching resist pattern material may be selected from a dissoluble solvent group. For example, when a novolac resin is used as the etching resist pattern material, IPA may be used as the solvent. Further, a drying temperature is appropriately near the boiling point of a selected solvent and may be in the range of room temperature to 300° C., but is not limited thereto.

In the present invention, during or after process b) of the forming of the etching resist pattern, a bake process may be performed (FIGS. 9 to 12). In detail, the bake process may be performed after forming the etching resist layer on the substrate during process b) or before the forming of the conductive pattern in process c). The bake process may be performed so as to prevent the deformation of the etching resist pattern during the baking process or the subsequent process by giving an adhesive force between the etching resist pattern and a layer adjacent thereto and simultaneously, at least partially curing the etching resist pattern and to stably form a reflowing shape of the etching resist pattern in the subsequent reforming process of the etching resist pattern as necessary. The hardness of the etching resist pattern to be achieved by the bake process may be determined by those skilled in the art according to the etching resist pattern material or the subsequent reforming condition as necessary, and for example, may be in the range of 0% to 100%.

The condition of the bake process may be selected by those skilled in the art according to a material of the etching resist pattern, a line height of the etching resist pattern, and an etching condition used for the formation of a conductive wire, for example, a kind of the etchant, an etching time, an etching temperature, or the like. If the bake temperature is very high, a crosslinking degree of the etching resist pattern is very high, such that the deformation, for example, distortion of a pattern area and the like may occur.

The method according to the present invention may further comprise a cleaning process after process c), d), or e). In the cleaning process, the etchant used in process c) may be used. A foreign substance may be removed by performing the cleaning process.

In the present invention, a material having conductivity of a certain level or more may be used as the conductive pattern material. A material that does not have transmittance of a material itself, but may transmits light according to a line width and transmittance may be used as the conductive pattern material. The conductive pattern may be a metallic pattern. When a transparent conductive oxide such as ITO is used, there is a problem in that a surface resistance is very large as 30 ohm/square or more and there are many problems in a process for obtaining desired conductivity or a subsequent process, which is not appropriate in the present invention. Meanwhile, the surface resistance of the metallic pattern is calculated by dividing the surface resistance of the metal layer deposited on the entire surface by ((100−transmittance)/100). For example, when a metal thin film having the surface resistance of about 0.5 ohm/square is deposited by the combination of black metal and Al to form a metallic pattern having an aperture ratio of 95%, the surface resistance of the metallic pattern may be acquired at a level of 0.5/0.05=10 ohm/square. That is, the metallic pattern has a very low surface resistance in the same transmittance as compared with the transparent metal oxide such as ITO. Further, it is most preferred that there is no yellowish characteristic which is a problem of the ITO in view of visibility.

For example, the conductive pattern may be formed by a single layer or a multilayer comprising silver, copper, aluminum, neodymium, molybdenum, nickel or an alloy thereof. Further, copper particles coated with silver may also be used as the conductive pattern material.

Figure 14:
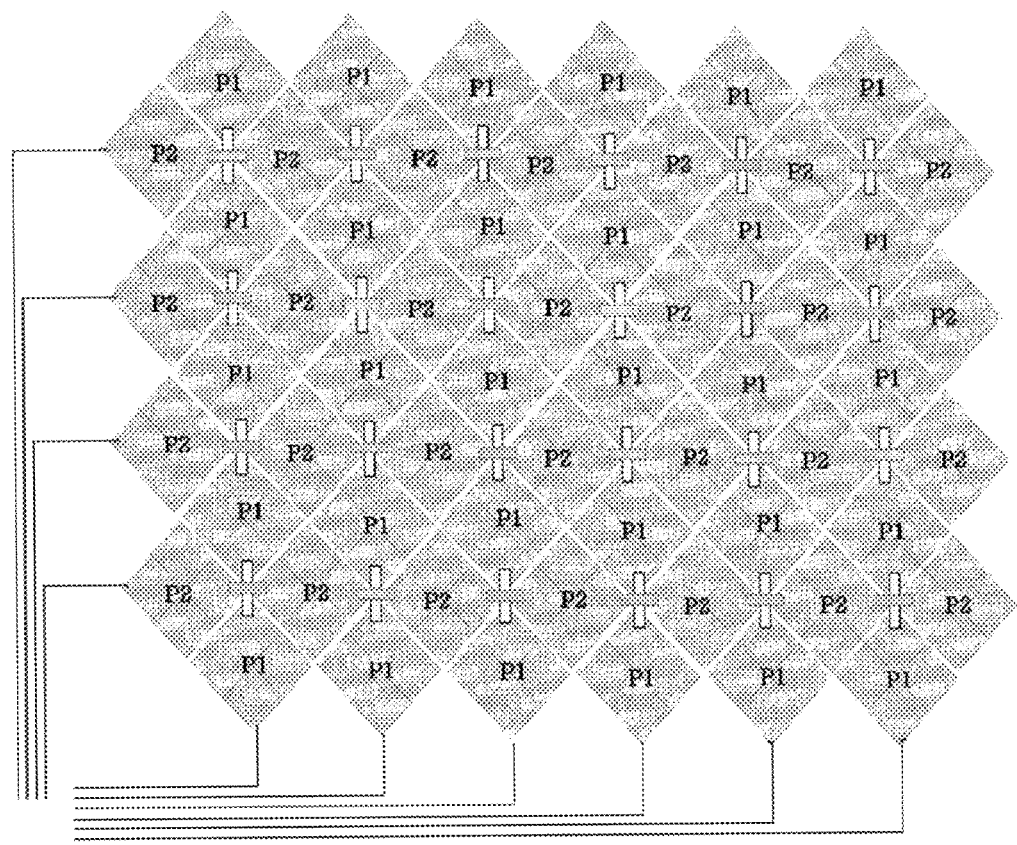
FIG. 14 is an exemplified diagram illustrating a structure of a router part of a touch screen according to the present invention.

The touch screen according to the present invention may further comprise a first router unit electrically connected to the first conductive pattern and a second router unit electrically connected to the second conductive pattern electrically connected through the transparent conductive bridge and the first router unit and the second router unit may be provided on the same surface as the surface where the first conductive pattern and the second conductive pattern are disposed on the substrate. The router units are to connect the first conductive pattern and the second conductive pattern with the pad part, respectively, and the structure thereof may use a structure that is known in the art. The structure having the router unit is shown in FIG. 14. In FIG. 14, P1 represents a pattern region of the first conductive pattern and P2 represents a pattern region of the second conductive pattern. However, the scope of the present invention is not limited to the structure shown in FIG. 14.

As described above, the first router unit and the second router unit may be formed together with the first conductive pattern and the second conductive pattern. That is, after the entire pattern form comprising the first conductive pattern, the second conductive pattern, the first router unit, and the second router unit is designed, the pattern may be formed on the substrate by using the above method. In this case, the first router unit and the second router unit are made of the same material as the first conductive pattern and the second conductive pattern and have the same line height as the conductive patterns.

In the present invention, the conductive pattern and the router unit may be directly formed on tempered glass and may also be attached to the tempered glass after being formed on glass or a film.

In the present invention, a line width of the conductive pattern may be 10 micrometers or less, in the range of 0.1 to 10 micrometers, in the range of 0.2 to 7 micrometers, and 5 micrometers or less. A line height of the conductive pattern may be 10 micrometers or less, 2 micrometers or less, in the range of 10 to 500 nm, and 10 to 300 nm. The line height is in the range capable of being implemented by a vacuum deposition such as a sputtering and is preferable to form a fine pattern.

Further, a pitch of the conductive pattern may be 1,000 micrometers or less, 600 micrometers or less, and 250 micrometers or less, but may be adjusted by those skilled in the art according to desired transmittance and a surface resistance.

The light transmittance of the entire pattern comprising the first conductive pattern and the second conductive pattern may be in the range of 85% to 99%.

In the present invention, the light transmittance of the entire area comprising the first and second conductive patterns, the transparent insulating part, and the transparent conductive bridge may be uniform. As a result, the conductive pattern, the transparent insulating part, and the transparent conductive bridge may be visually covered. To this end, the respective constituent elements may be disposed so as to have a light transmittance deviation of 7% or less or 5% or less to a light transmittance average value of any circle having a diameter of 1 inch in the entire area comprising the first and second conductive patterns, the transparent insulating part, and the transparent conductive bridge.

For the uniformity of the light transmittance, the light transmittance of some regions of the first conductive pattern and the second conductive pattern may be controlled differently from those of the rest of the regions. For example, the light transmittance of the conductive pattern itself in the region corresponding to the transparent conductive bridge is larger than those of the rest of the regions, thereby compensating visibility due to a layout of the transparent conductive bridge. The control of the light transmittance may be performed by controlling the pitch of the conductive pattern or disconnecting the pattern. Further, the control of the light transmittance may also be performed by using a third conductive pattern to be described below which is not electrically connected to the first conductive pattern and the second conductive pattern.

In the present invention, the surface resistance of the first conductive pattern and the second conductive pattern may be 1 to 250 ohm/square, respectively. The range of the surface resistance is advantageous to the operation of the touch screen.

The touch screen according to the present invention may further comprise a third conductive pattern which is not electrically connected to any one of the first conductive pattern and the second conductive pattern. Herein, the electrical disconnection means a state where a current does not flow when voltage is applied. In the present invention, the first conductive pattern and the second conductive pattern are configured in a pattern form optimized for the operation of the touch screen and a third conductive pattern which is not electrically connected to the first and second conductive patterns may be further comprised in order to solve a problem in which the conductive patterns, the transparent insulating part, or the transparent conductive bridge is visually observed. Substantially, the light transmittance in the entire area in which the conductive patterns, the transparent insulating part, and the transparent conductive bridge are formed may be uniformly controlled by using the third conductive pattern which is not involved in the operation of the touch screen.

In the present invention, the entire pattern area configured by the first to third conductive patterns comprises two or more conductive lines spaced apart from each other in a longitudinal direction and a distance between the nearest ends of the two or more spaced conductive lines may be 20 μm or less. The distance between the nearest ends of the two or more spaced conductive lines may be 20 μm or less, 15 μm or less, more than 0 to 10 μm or less, and 1 μm or more to 5 μm or less.

In this specification, the distance between the nearest ends of the two or more spaced conductive lines means a distance between the most adjacent ends of two or more spaced conductive lines.

When the touch screen according to the present invention comprises the third conductive pattern, the light transmittance of the entire area comprising the first to third conductive patterns, the transparent insulating part, and the transparent conductive bridge may be uniform. To this end, the respective constituent elements may be disposed so as to have a light transmittance deviation of 7% or less or 5% or less to a light transmittance average value of any circle having a diameter of 1 inch in the entire area comprising the first to third conductive patterns, the transparent insulating part, and the transparent conductive bridge.

Even when the touch screen further comprises the third conductive pattern, for the uniformity of the light transmittance, the light transmittance of some regions of the entire conductive pattern comprising the first to third conductive patterns may be controlled differently from that of the rest of the regions. For example, the light transmittance of the conductive pattern itself in the region corresponding to the transparent conductive bridge is larger than those of the other regions, thereby compensating visibility due to a layout of the transparent conductive bridge. The control of the light transmittance may be performed by controlling the pitch of the conductive pattern or disconnecting the pattern. Further, the touch screen further comprises the third conductive pattern in a region other than the region corresponding to the transparent conductive bridge, thereby increasing the light transmittance of the conductive pattern itself of the region corresponding to the transparent conductive bridge. As a result, the light transmittance in the entire area after the transparent conductive bridge is formed may be uniformly controlled.

The third conductive pattern may be formed together when the first conductive pattern and the second conductive pattern are formed. That is, after the entire pattern form comprising the first to third conductive patterns is designed, the designed conductive pattern may be formed on the substrate. For example, the third conductive pattern may be formed by disconnecting the pattern after being formed as a part of the first conductive pattern or the second conductive pattern.

As described above, when the first to third conductive patterns are formed together, the third conductive pattern is made of the same material as the first conductive pattern and the second conductive pattern and has the same line height as the first and second conductive patterns. The line height of the third conductive pattern may be in the range of 10 to 500 nm. A line width and a line distance of the third conductive pattern are also the same as those described in the first conductive pattern and the second conductive pattern.

The conductive pattern may be a regular pattern and an irregular pattern. The pattern form may be selected based on the entire pattern comprising the first conductive pattern and the second conductive pattern. Similarly, even when the third conductive pattern is comprised, the pattern form may be selected based on the entire pattern comprising the first to third conductive patterns. As described above, the pattern form is determined based on the entire pattern, such that the pattern may be selected by considering a covering property of the pattern, that is, a property in which a user does not recognize the pattern.

A pattern form of the art such as a mesh pattern, a wave pattern, or the like may be used as the regular pattern. When the regular pattern is used, an angle may be arranged by finding a moire avoidance angle.

When the conductive pattern is the irregular pattern, although the angle is not controlled, it is possible to prevent the moire.

In the case where the conductive pattern is the irregular pattern, when a straight line intersecting with the pattern is drawn, the pattern may comprise a pattern of which a ratio of the standard deviation (ratio of distance distribution) to an average value of distances between adjacent intersection points of the straight line and the pattern is 2% or more, 10% or more, or 20% or more.

The straight line intersecting with the pattern may be a line having the smallest standard deviation of the distances between the adjacent intersection points of the pattern. Further, the straight line intersecting with the pattern may be a straight line extended in a vertical direction to the tangent of any one point of the pattern. The number of the intersection points with the pattern of the straight line intersecting with the pattern may be 80 or more.

Further, in the case where the conductive pattern is the irregular pattern, the pattern may be configured by continuously distributed closed figures and comprise a pattern of which a ratio of the standard deviation (ratio of area distribution) to an average value of areas of the closed figures is 2% or more, 10% or more, or 20% or more. The number of the closed figures may be at least 100.

When the patterns are completely irregular, a difference between a sparse portion and a dense portion in a line distribution may occur. There is a problem in that the line distribution is observable no matter how thin the line width may be. In order to solve the visual recognition problem, regularity and irregularity of the pattern may be appropriately balanced. For example, in order to cover the pattern, a basic unit is determined and the pattern may be irregularly formed in the basic unit. If the above method is used, the visibility may be compensated by preventing the distribution of lines from being concentrated at any one point.

In the present invention, in order to improve a visual covering of the conductive pattern, the transparent insulating part, and the transparent conductive bridge, when all the constituent elements are formed, the light transmittance may be uniform in a unit area. The light transmittance deviation to a light transmittance average value to any circle having a diameter of 1 inch may be 7% or less and 5% or less. Herein, the light transmittance average value may be calculated by setting any circle having a diameter of 1 inch to measure the light transmittance 5 times or more.

As described above, for the uniformity of the light transmittance, the conductive pattern may have the light transmittance deviation in the transparent insulating part and the transparent conductive bridge, particularly, the region with the transparent conductive bridge and the region without the transparent conductive bridge so that the light transmittance deviation becomes small when both the transparent insulating part and the transparent conductive bridge are formed. The light transmittance deviation may be determined by the light transmittance of the transparent insulating part and the transparent conductive bridge, particularly, the transparent conductive bridge.

In the present invention, the metal lines configuring the pattern may be straight lines, but may have various modified shapes such as a curved line, a wave line, a zigzag line, and the like.

The irregular pattern may be 30% or more in the entire pattern area, 70% or more, and 90% or more.

The irregular pattern may be a boundary form of figures configuring a Voronoi diagram. In this case, the boundary may be a straight line or a curved line.

Figure 15:
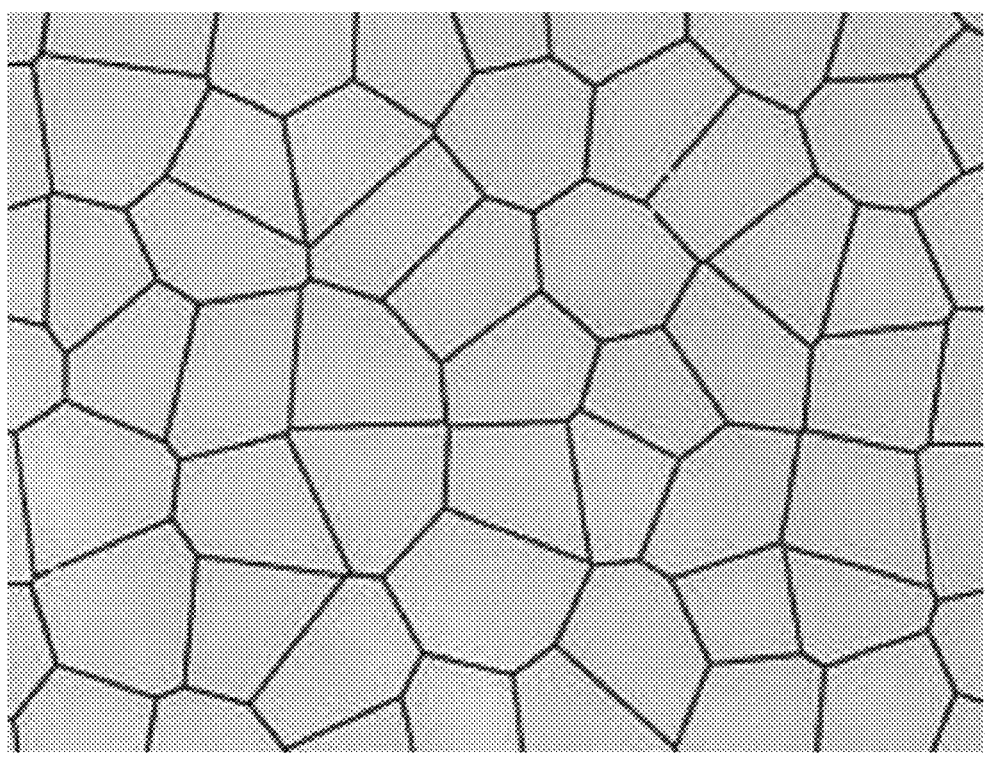
FIG. 15 is an exemplified diagram illustrating one shape of a conductive pattern according to the present invention.

The Voronoi diagram is a pattern configured in a method of filling a region having the closest distance between each dot and the corresponding dots as compared with the distance from other dots, when dots called a Voronoi diagram generator are disposed in a region to be filled. For example, when large-scale discount stores over the country are represented by dots and customers find the closest large-scale discount store, a pattern representing a commercial zone of each discount store may be exemplified. That is, when a space is filled by regular hexagons and dots of the regular hexagons are selected as the Voronoi diagram generators, a honeycomb structure may be the conductive heating line pattern. In the present invention, when the conductive pattern is formed by using the Voronoi diagram generators, it is advantageous that a complicated pattern form may be easily determined. An example of the irregular pattern is shown in FIG. 15.

In the present invention, the Voronoi diagram generators are regularly or irregularly positioned to use a pattern derived from the generators.

Even in the case where the conductive pattern is formed in a boundary form of the figures that form the Voronoi diagram, as described above, in order to solve the visual recognition problem, when the Voronoi diagram generator is generated, the regularity and irregularity may be appropriately harmonized. For example, after the area having a predetermined size is set as a basic unit in the area in which the pattern is provided, the dots are generated so that the distribution of dots in the basic unit has the irregularity, thereby manufacturing the Voronoi pattern. If the above method is used, the visibility may be compensated by preventing the distribution of lines from being concentrated at any one point.

As described above, for the visibility of the pattern, when the light transmittance of the pattern becomes uniform in a unit area, it is possible to control the number of the Voronoi diagram generators per unit area. In this case, when the number of the Voronoi diagram generators per unit area is uniformly controlled, the unit area may be 5 cm$^2$ or less and 1 cm$^2$ or less. The number of the Voronoi diagram generators per unit area may be in the range of 25 to 2,500/cm$^2$ and in the range of 100 to 2,000/cm$^2$.

At least one of the figures that form the pattern in the unit area may have the different shape from the other figures. In the present invention, the first conductive pattern and the second conductive pattern may have a laminated structure comprising a metal layer and a light absorption layer provided on at least one side of the metal layer. The light absorption layer may be provided to be closer to the side viewed from a user of the touch screen than the metal layer and may be provided on one side or both sides of the metal layer. The light absorption layer reduces amounts of light inputted to the metal layer and light reflected from the metal layer, thereby reducing reflectance due to the metal layer. The light absorption layer may have lower reflectance than the metal layer. As a result, the reflectance of light may be reduced as compared with the case where the user directly views the metal layer, thereby largely reducing the visibility of the conductive pattern.

The light absorption layer may be formed by a material having reflectance of the entire surface layer of 70% or less, 50% or less, 40% or less, or 30% or less. A material having high reflectance such as Ag, Au, or Al may be a material which is not suitable for the light absorption layer in the present invention. The reflectance is preferably smaller, but a material having reflectance in the entire surface layer of 0.1% or more may be used in view of a material selection. Herein, the reflectance means the reflectance of the entire surface layer made of the light absorption layer material, not the reflectance of the light absorption layer itself. Although made of the same material, since the entire surface layer without the pattern and the pattern have different light transmittances, the reflectance thereof is different from each other.

The reflectance is preferably a value measured based on a value of a wavelength of 550 nm among reflective light reflected by a target layer to which light is inputted when incident light is 100% or the conductive pattern comprising the metal layer and the light absorption layer. In general, the reason is because the reflectance of the wavelength of 550 nm is not largely different from the entire reflectance. For example, after a top light absorption layer is formed on the substrate by using a deposition method, for example, a sputtering method, a chemical vapor deposition (CVD) method, a thermal evaporation method, an e-beam deposition method, or the like, the reflectance (550 nm) of visible light inputted from air may be measured. In this case, a blackening treatment is entirely performed on the rear surface of the substrate, that is, the surface where the light absorption layer is not formed, thereby removing reflection in the rear surface of the substrate. The substrate may use a transparent substrate, but is not particularly limited and for example, may use glass, a plastic substrate, a plastic film, or the like.

The reflectance of the entire surface layer made of the material configuring the light absorption layer is not particularly limited, but may be 5% or more, 15% or more, and 20% or more.

Further, the light transmittance of the entire surface layer made of the material configuring the light absorption layer is not particularly limited, but may be 50% or less. The light transmittance means a value obtained by subtracting a sum of percentages of the reflectance and the light absorbance from 100% when being calculated as a percentage.

After the top light absorption layer is formed by using a deposition method, for example, a sputtering method, a chemical vapor deposition (CVD) method, a thermal evaporation method, an e-beam deposition method, or the like, the light absorption layer may be formed by patterning the formed top light absorption layer. As described above, the light absorption layer may be directly formed on the substrate or the metal layer without using an adhesive layer or a bonding layer by using the deposition method and desired thickness and pattern shape may be implemented.

Figure 16:
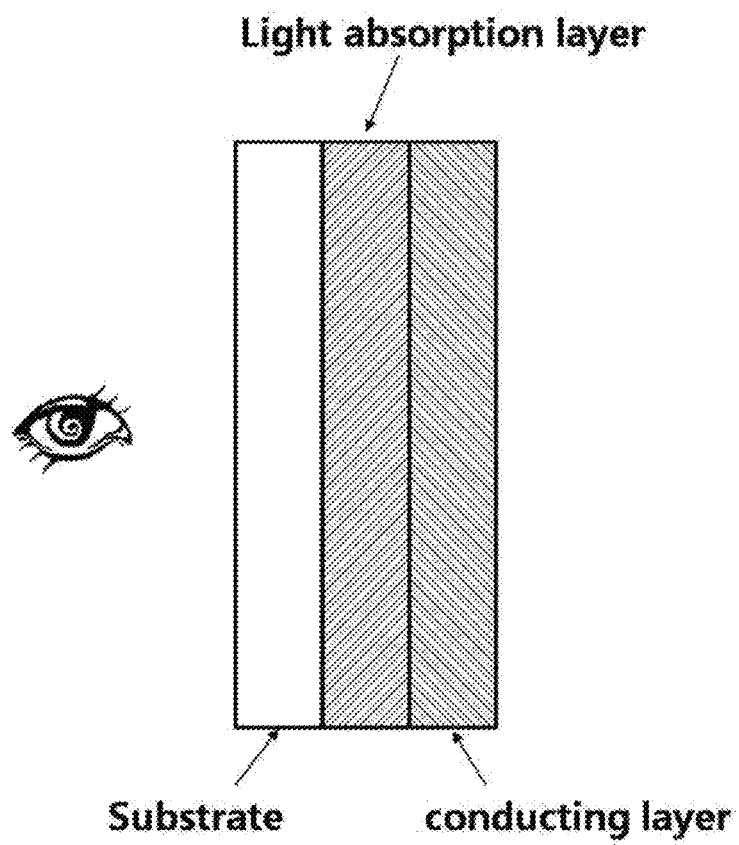
FIGS. 16 to 18 are exemplified diagrams illustrating a structure of a conductive pattern according to an exemplary embodiment of the present invention.
Figure 17:
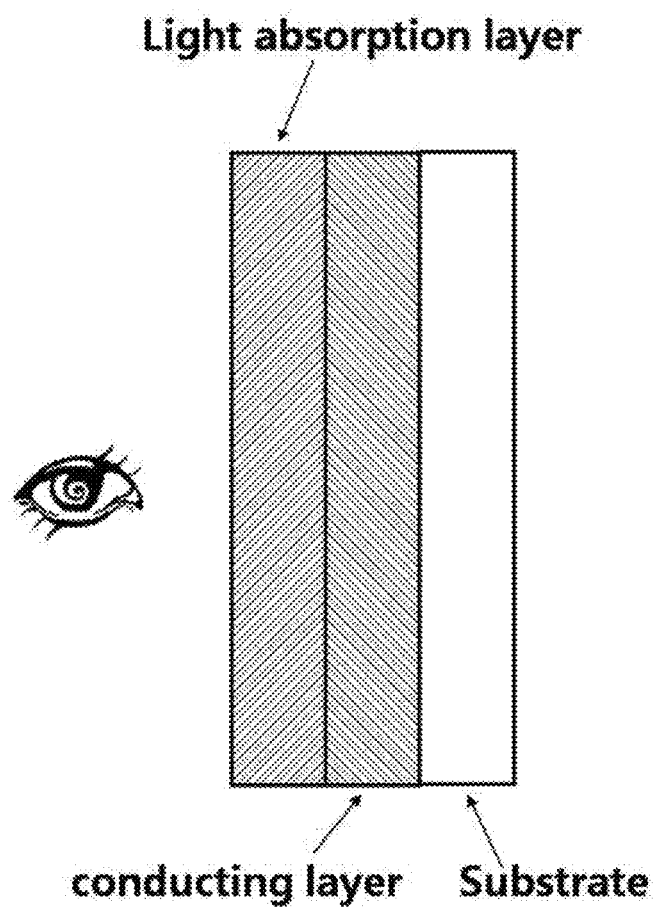
Figure 18:
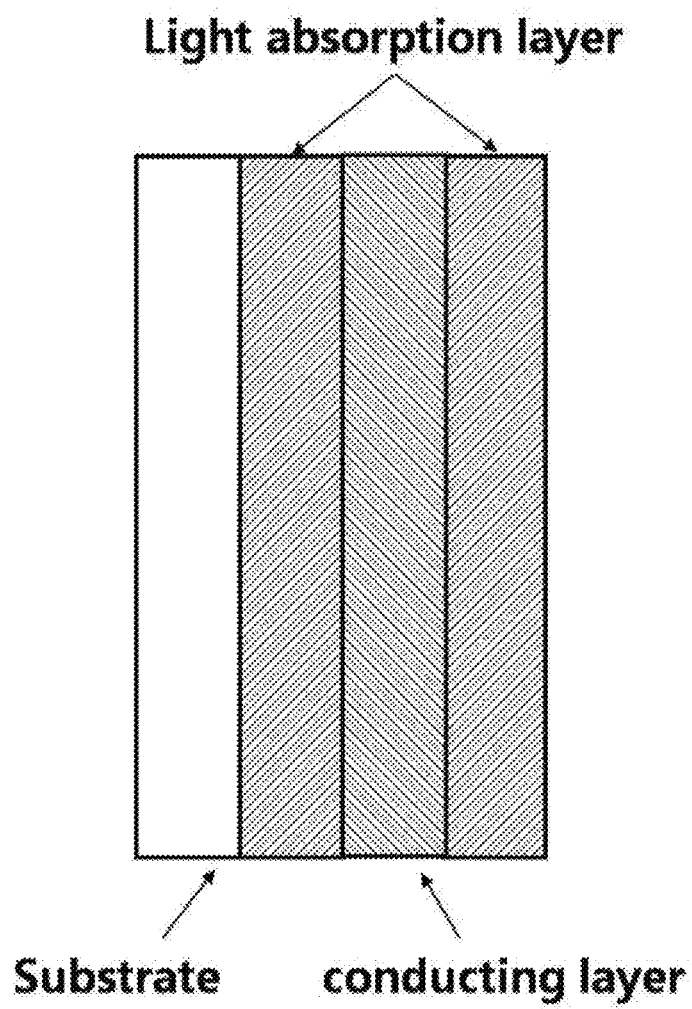

An example in which the conductive pattern according to the present invention comprises the metal layer and the light absorption layer is shown in FIGS. 16 to 18. FIGS. 16 to 18 show a laminated order of the substrate, the conductive pattern, and the light absorption layer and the conductive pattern and the light absorption layer actually have the pattern form, not the entire surface layer.

FIG. 16 shows that the light absorption layer is disposed between the substrate and the metal layer. As a result, when the user views the touch screen from the substrate side, the reflectance due to the metal layer may be largely reduced. FIG. 17 shows that the light absorption layer is disposed on the opposite surface of the substrate side of the metal layer. As a result, when the user views the touch screen from the opposite side of the substrate side, the reflectance due to the metal layer may be largely reduced. FIG. 18 shows that the light absorption layer is disposed between the substrate and the metal layer and on the opposite surface of the substrate side of the metal layer. As a result, when the user views the touch screen from the substrate side and from the opposite side of the substrate side, the reflectance due to the metal layer may be largely reduced.

In the present invention, the light absorption layer may be patterned simultaneously with or separately from the metal layer, but a layer for forming each pattern is separately formed. The pattern is formed as described above, thereby implementing a fine conductive pattern required for the touch screen while optimizing and maximizing an effect due to the light absorption layer itself. In the touch screen, when the fine conductive pattern is not implemented, the properties required for driving the touch screen such as resistance and the like may not be achieved.

In the present invention, since the light absorption layer and the metal layer form a laminated structure as a separate layer, the structure is discriminated from a structure in which the at least a part of a light absorptive material is depressed or dispersed in the metal layer or a structure in which a part of the surface of the single-layered conducting layer is physically or chemically deformed by a surface treatment.

Further, the light absorption layer is directly provided on the substrate or the metal layer without the adhesive layer or the bonding layer interposed therebetween. The adhesive layer or the bonding layer may influence durability or an optical property. Further, a manufacturing method of the conductive pattern comprising the light absorption layer and the metal layer according to the present invention is entirely different from the case of using the adhesive layer or the bonding layer. Furthermore, in the present invention, an interface property between the substrate or the metal layer and the light absorption layer is excellent as compared with the case of using the adhesive layer or the bonding layer.

The thickness of the light absorption layer is not particularly limited if the light absorption layer has the above reflectance. However, when considering an etching property with the metal layer during the manufacturing process, the thickness may be selected in the range of 10 nm to 400 nm, but a preferable thickness may vary according to a used material and a manufacturing process. Accordingly, the scope of the present invention is not limited to the numerical range.

The light absorption layer may be formed as a single layer and may also be formed as a multilayer having two or more layers.

The light absorption layer may represent achromatic colors. Herein, the achromatic color means a color represented when light inputted to the surface of an object is not selectively absorbed, but equally reflected and absorbed to a wavelength of each component. The light absorption layer may use a material having the standard deviation of the reflectance within 50% for each wavelength when measuring the reflectance in a visible light area (400 nm to 800 nm).

The material of the light absorption layer may be used without particular limitation if the material is a material having the above reflectance when the entire surface layer is formed as a light adsorptive material. For example, the materials used as black matrix materials in a color filter may be used. Further, examples of the material of the light absorption layer may also comprise a light adsorptive material having an anti-reflective function.

For example, the light absorption layer may be an oxide film, a nitride film, an oxide-nitride film, a carbide film, or a metallic film which is formed by using Ni, Mo, Ti, Cr, or the like under a deposition condition or the like set by those skilled in the art. In the case of using Mo, the nitride has an optical property more suitable for the light absorption layer described in the present invention than the oxide.

As a detailed example, the light absorption layer may comprise both Ni and Mo. The light absorption layer may comprise Ni of 50 to 98 atom % and Mo of 2 to 50 atom % and may further comprise other metals, for example, Fe, Ta, Ti, and the like of 0.01 to 10 atom %. Herein, as necessary, the light absorption layer may also further comprise nitrogen of 0.01 to 30 atom % or oxygen and carbon of 4 atom % or less.

As another detailed example, the light absorption layer may comprise a dielectric material selected from SiO, $SiO_2$, $MgF_2$, and $SiN_x$ (x is an integer of 1 or more) and a metal selected from Fe, Co, Ti, V, Al, Cu, Au, and Ag and may further comprise an alloy of two or more metals selected from Fe, Co, Ti, V, Al, Cu, Au, and Ag. The dielectric material is distributed so as to be gradually decreased as being far away from a direction to which external light is inputted and the metal and the alloy component may be distributed in reverse. In this case, the content of the dielectric material may be 20 to 50 wt % and the content of the metal may be 50 to 80 wt %. When the light absorption layer further comprises the alloy, the light absorption layer may comprise the dielectric material of 10 to 30 wt %, the metal of 50 to 80 wt %, and the alloy of 5 to 40 wt %.

As another detailed example, the light absorption layer may be formed of a thin film comprising any one or more of an alloy of nickel and vanadium and an oxide, nitride, or oxynitride of nickel and vanadium. In this case, the vanadium may be contained by 26 to 52 atom % and an atom ratio of vanadium to nickel may be 26/74 to 52/48.

As another detailed example, the light absorption layer may comprise a transition layer comprising two or more atoms and having a composition ratio of one atom increased by about 20% per 100 angstroms in a maximum according to the direction to which the external light is inputted. In this case, one atom may be a metal atom such as chromium, tungsten, tantalum, titanium, iron, nickel, or molybdenum and an atom other than the metal atom may be oxygen, nitrogen, or carbon.

Further, as another detailed example, the light absorption layer may comprise a first chromium oxide layer, a metal layer, a second chromium oxide layer, and a chromium mirror and in this case, may comprise a metal selected from tungsten, vanadium, iron, chromium, molybdenum, and niobium, instead of chromium. The metal layer may have a thickness of 10 to 30 nm, the first chromium oxide layer may have a thickness of 35 to 41 nm, and the second chromium oxide layer may have a thickness of 37 to 42 nm.

Further, as another detailed example, the light absorption layer may have a laminated structure of an alumina ($Al_2O_3$) layer, a chromium oxide ($Cr_2O_3$) layer, and a chromium (Cr) layer. Herein, the alumina layer has the properties of improving reflection and preventing light diffusion and the chromium oxide layers may improve a contrast property by reducing mirrored reflectance.

The line width of the light absorption layer does not need to be completely equal to the line width of the metal layer and even the case where the line width of the light absorption layer is smaller or larger than the line width of the metal layer is comprised in the scope of the present invention. For example, the light absorption layer may have an area of 80% to 120% to an area occupied by the metal layer.

The light absorption layer may have a pattern form having a line width equal to or larger than the metal layer.

When the light absorption layer has a pattern form having a line width equal to or larger than the metal layer, an effect of covering the conductive pattern by the light absorption layer may be larger when the user views the light absorption layer, such that it is possible to efficiently prevent a gloss of the metal layer itself or an effect due to the reflection. However, although the line width of the light absorption layer is equal to the line width of the metal layer, a desired effect in the present invention may be achieved. The line width of the light absorption layer may have a width larger than the line width of the metal layer by a value obtained by the following Equation.

$$T_{con} \times \tan\theta_3 \times 2 \quad \text{[Equation]}$$

In the Equation, Tcon is a thickness of the metal layer, and $\theta_3$ is an angle between the light and a normal line to the substrate surface, when the light inputted from a place where a user's view is positioned passes through edges of the metal layer and the light absorption layer.

Figure 19:
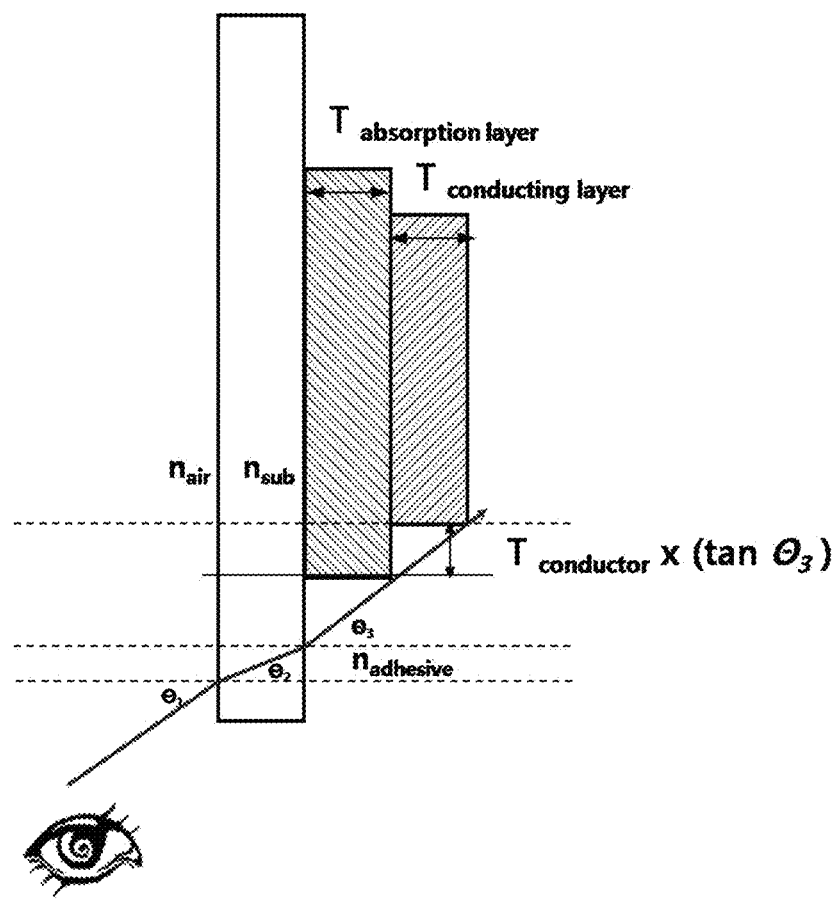
FIG. 19 is an exemplified diagram illustrating a width relationship between an absorptive layer and a metallic layer of a conductive pattern according to an exemplary embodiment of the present invention.

For example, in the laminated structure shown in FIG. 16, an equation calculated by the Equation is shown in FIG. 19. $\theta_3$ is an angle in which an angle $\theta_1$ between the user's view and the substrate is changed according to Snell's law by a refractive index of the substrate and a refractive index of a medium of the region where the light absorption layer and the metal layer are disposed, for example, an adhesive of the touch screen.

As an example, assuming that a viewer views the conductive pattern so that the value of $\theta_3$ is about 80 degrees and the thickness of the metal layer is about 200 nm, the light absorption layer may have a larger line width than the metal layer by about 2.24 micrometers (200 nm×tan(80)×2). However, as described above, even when the light absorption layer has the same line width as the metal layer, the desired effect in the present invention may be achieved.

In the present invention, even in the case where a material having the reflectance of 70% to 80% or more is used as the material of the metal layer, it is possible to reduce the reflectance through the light absorption layer, reduce the visibility of the metal layer, and maintain or improve the contrast property.

In the touch screen according to the present invention, the entire reflectance of the conductive pattern comprising the metal layer and the light absorption layer and the substrate may be 70% or less, 50% or less, 40% or less, and 30% or less. Herein, the reflectance means the reflectance of the light inputted from the side with the light absorption layer and is a value except for the reflectance in an interface between the substrate and an air layer. The entire reflectance may be further controlled by controlling the reflectance by the selection of the material configuring the light absorption layer and controlling the reflectance in an interface between the metal layer and the light absorption layer, the thickness of the metal layer, a form of the pattern, and the like.

In the present invention, a sum of the thicknesses of the metal layer and the light absorption layer may be in the range of 10 to 500 nm.

In the present invention, the transparent insulating part and/or the transparent conductive bridge may be formed by an inkjet method or a dispensing method.

The material of the transparent insulating part is not particularly limited if the material is a transparent material having insulation. The light transmittance of the transparent insulating part may be 85% or more and 95% or more. Further, the dielectric constant of the transparent insulating part may be in the range of 2 to 10. Examples of the material of the transparent insulating part may comprise an overcoat (OC) material for an LCD. In detail, examples of the material of the transparent insulating part may comprise thermosetting or photocurable acryl-based resins or materials having an optical property corresponding thereto.

The thickness and the area of the transparent insulating part may be selected according to a property required for a final use, for example, a capacitive touch screen.

In the present invention, the transparent conductive bridge may be formed by using a material having the light transmittance of 75% or more, 80% or more, or 85% or more. When an opaque metallic material is used as the conductive bridge, the process costs increases and the problem on the visibility is large. However, in the present invention, since the transparent conductive bridge is formed through the inkjet process or the dispensing process by using the above transparent material, the process costs may be reduced and the process efficiency may become excellent.

The transparent conductive bridge may be formed by using a transparent conductive material such as a transparent conductive polymer, nano wired ink, or the like. For example, the transparent conductive bridge may be formed by using a printing composition comprising an Ag nano wire of 1 wt % to 10 wt % and preferably 5 wt %, for example, silver nano wired ink (manufactured by Cambrios Technologies Corporation), ITO, IZO, ITO sol, zinc oxide, a CNT solution, Graphene, PEDOT, PSS, or the like. The surface resistance of the transparent conductive bridge may be 100 ohm/square or less.

The thickness and the area (width) of the transparent conductive bridge may be selected according to a final use.

In the present invention, a protective layer may be further provided on the surface where the first conductive pattern, the second conductive pattern, the transparent conductive bridge, and the transparent insulating part are provided. The protective layer may be an adhesive film comprising an adhesive layer, glass comprising an adhesive layer, or a hard coating layer.

When the protective layer is the adhesive film comprising an adhesive layer and the glass comprising an adhesive layer, a difference between the refractive index of the adhesive layer and the refractive index of the transparent conductive bridge and the transparent insulating part may be 0.05 or less. With the range in the difference of the refractive index, it is advantageous to improve the covering property of the conductive pattern and achieve the uniform light transmittance.

In the present invention, a distance between the adjacent pattern regions comprised in the first to third conductive patterns may be controlled according to an area or a kind of the display and for example, may be 15 micrometers or less and 7 micrometers or less, but the scope of the present invention is not limited thereto.

Figure 20:
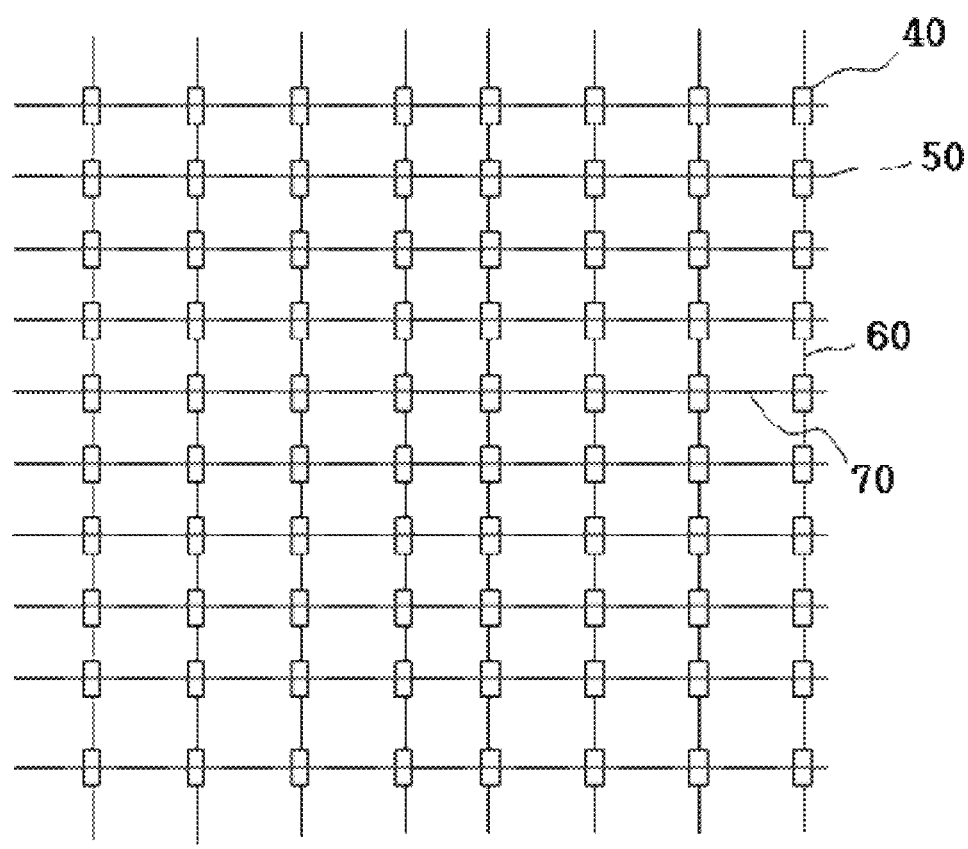
FIG. 20 is an exemplified diagram illustrating a layout of an upper surface of a touch screen according to an exemplary embodiment of the present invention.

As described above, in the present invention, the first conductive pattern and the second conductive pattern comprise metal lines, respectively in addition to two or more conductive pattern regions, respectively. For example, the present invention provides a single-sided one-sheet type capacitive touch screen, comprising: a substrate; a first conductive pattern disposed on the substrate in a vertical direction and comprising at least two pattern columns having metal lines electrically connected with each other; a second conductive pattern which is disposed on the same surface of the substrate as the surface where the first conductive pattern is disposed, is not electrically connected with the first conductive pattern, and comprises two or more metal lines not electrically connected with each other; a transparent conductive bridge electrically connecting the metal lines of the second conductive pattern in a horizontal direction; and a transparent insulating part disposed between the transparent conductive bridge and the first conductive pattern to electrically insulate the transparent conductive bridge and the first conductive pattern. A layout state of the conductive pattern, the transparent insulating part, and the transparent conductive bridge in the touch screen configured as described above is shown in FIG. 20. Each configuration follows the above description, except that each pattern region is formed by the metal line.

The touch screen according to the present invention may further comprise an optical clear adhesive (OCA) layer, glass, a hard coating layer, an anti-reflective layer, and a surface layer having other functions at the side viewed from the user. The functional layer may be provided as a coating layer and be attached by the adhesive layer.

Further, another exemplary embodiment of the present invention provides a manufacturing method of the aforementioned single-sided one-sheet type capacitive touch screen. In detail, the manufacturing method comprises:

forming a first conductive pattern disposed on a substrate in a vertical direction and comprising at least two pattern columns having two or more conductive pattern regions electrically connected with each other;

forming a second conductive pattern which is disposed on the same surface of the substrate as the surface where the first conductive pattern is disposed, is not electrically connected with the first conductive pattern, and comprises two or more conductive pattern regions not electrically connected with each other;

forming a transparent insulating part at a portion electrically connected with the first conductive pattern when electrically connecting the conductive pattern regions of the second conductive pattern in a horizontal direction; and forming a transparent conductive bridge electrically connecting the conductive pattern regions of the second conductive pattern in a horizontal direction.

The method may use a known method in the art by using the above materials.

As described above, according to the exemplary embodiments of the present invention, since the single-sided one-sheet type touch screen can be provided, a thickness of the touch screen can be minimized, and since all the conductive patterns are formed on a single side, the manufacturing method can be easy. Further, since the touch screen is one sheet type, it is advantageous that a lamination is not required as compared with the related art of forming a touch screen by using two or more sheets of substrates. Further, since the first conductive pattern and the second conductive pattern are disposed on the same surface, installation and attachment of an FPCB are easy. Further, since the touch screen is one sheet type, the light transmittance is excellent as compared with the two-sheet type. Further, when a functional surface film is laminated on the surface of the touch screen, a process is not large, such that bubbles are not filled therein.

The invention claimed is:

1. A single-sided one-sheet type capacitive touch screen, comprising:
    a substrate;
    a first conductive pattern disposed on the substrate in a vertical direction and comprising at least two pattern columns having two or more conductive pattern regions electrically connected with each other;
    a second conductive pattern which is disposed on the same surface of the substrate as the surface where the first conductive pattern is disposed, is not electrically connected with the first conductive pattern, and comprises two or more conductive pattern regions not electrically connected with each other;
    a transparent conductive bridge electrically connecting the conductive pattern regions of the second conductive pattern in a horizontal direction; and
    a transparent insulating part disposed between the transparent conductive bridge and the first conductive pattern to electrically insulate the transparent conductive bridge and the first conductive pattern,
    wherein the first conductive pattern and the second conductive pattern are a metallic pattern.

2. The single-sided one-sheet type capacitive touch screen of claim 1, further comprising:
    a first router unit electrically connected to the first conductive pattern; and
    a second router unit electrically connected to the second conductive pattern electrically connected through the transparent conductive bridge,
    wherein the first router unit and the second router unit are provided on the same surface as the surface where the first conductive pattern and the second conductive pattern are disposed on the substrate.

3. The single-sided one-sheet type capacitive touch screen of claim 2, wherein the first conductive pattern, the second conductive pattern, the first router unit, and the second router unit are made of the same material.

4. The single-sided one-sheet type capacitive touch screen of claim 1, wherein an angle between each pattern column of the first conductive pattern and each pattern column of the second conductive pattern is 80 to 100 degrees.

5. The single-sided one-sheet type capacitive touch screen of claim 1, wherein a light transmittance deviation to a light transmittance average value of a circle having a diameter of 1 inch in the entire area where the first and second conductive patterns, the transparent insulating part, and the transparent conductive bridge are formed is 7% or less.

6. The single-sided one-sheet type capacitive touch screen of claim 1, wherein the light transmittance of the conductive pattern itself in a region where the transparent conductive bridge is formed is different from the light transmittance of the conductive pattern in the rest of the regions.

7. The single-sided one-sheet type capacitive touch screen of claim 1, further comprising:
    a third conductive pattern which is not electrically connected to any one of the first conductive pattern and the second conductive pattern.

8. The single-sided one-sheet type capacitive touch screen of claim 7, wherein the entire pattern area configured by the first to third conductive patterns comprises two or more conductive lines spaced apart from each other in a longitudinal direction and a distance between the nearest ends of the two or more spaced conductive lines is 20 μm or less.

9. The single-sided one-sheet type capacitive touch screen of claim 7, wherein a light transmittance deviation to a light transmittance average value of a circle having a diameter of 1 inch in the entire area where the first to third conductive patterns, the transparent insulating part, and the transparent conductive bridge are formed is 7% or less.

10. The single-sided one-sheet type capacitive touch screen of claim 7, wherein the light transmittance of the conductive pattern itself in a region where the transparent conductive bridge is formed is different from the light transmittance of the conductive pattern in the rest of the regions.

11. The single-sided one-sheet type capacitive touch screen of claim 7, wherein the third conductive pattern is made of the same material as the first conductive pattern and the second conductive pattern.

12. The single-sided one-sheet type capacitive touch screen of claim 1, wherein line heights of the first conductive pattern and the second conductive pattern are 10 to 500 nm.

13. The single-sided one-sheet type capacitive touch screen of claim 7, wherein a line height of the third conductive pattern is 10 to 500 nm.

14. The single-sided one-sheet type capacitive touch screen of claim 1, wherein any one of the transparent insulating part and the transparent conductive bridge is formed by an inkjet method or a dispensing method.

15. The single-sided one-sheet type capacitive touch screen of claim 1, wherein the transparent insulating part comprises a thermosetting or photocurable acryl-based resin.

16. The single-sided one-sheet type capacitive touch screen of claim 1, wherein the transparent conductive bridge comprises a transparent conductive polymer or nano wired ink.

17. The single-sided one-sheet type capacitive touch screen of claim 1, wherein the first conductive pattern and the second conductive pattern comprise a metal layer and a light absorption layer provided on at least one side of the metal layer.

18. The single-sided one-sheet type capacitive touch screen of claim 7, wherein the third conductive pattern comprises a metal layer and a light absorption layer provided on at least one side of the metal layer.

19. The single-sided one-sheet type capacitive touch screen of claim 17 or 18, wherein the light absorption layer is disposed closer to a side of the touch screen viewed from a user than the metal layer.

20. The single-sided one-sheet type capacitive touch screen of claim 17 or 18, wherein a sum of thicknesses of the metal layer and the light absorption layer is 10 to 500 nm.

21. The single-sided one-sheet type capacitive touch screen of claim 1, wherein a protective layer is further provided on the surface where the first conductive pattern, the second conductive pattern, the transparent conductive bridge, and the transparent insulating part are provided.

22. The single-sided one-sheet type capacitive touch screen of claim 21, wherein the protective layer is an adhesive film comprising an adhesive layer, glass comprising an adhesive layer, or a hard coating layer.

23. The single-sided one-sheet type capacitive touch screen of claim 22, wherein a difference between a refractive index of the adhesive layer and a refractive index of the transparent conductive bridge and the transparent insulating part is 0.05 or less.

24. The single-sided one-sheet type capacitive touch screen of claim 1, wherein the conductive pattern region of the first conductive pattern and the conductive pattern region of the second conductive pattern comprise irregular patterns.

25. The single-sided one-sheet type capacitive touch screen of claim 1, wherein the conductive pattern region of the first conductive pattern and the conductive pattern region of the second conductive pattern comprise patterns having a boundary form of figures configuring a Voronoi diagram.

26. The single-sided one-sheet type capacitive touch screen of claim 7, wherein the entire pattern comprising the first to third conductive patterns comprises irregular patterns.

27. The single-sided one-sheet type capacitive touch screen of claim 7, wherein the entire pattern comprising the first to third conductive patterns comprises patterns having a boundary form of figures configuring a Voronoi diagram.

28. The single-sided one-sheet type capacitive touch screen of claim 1 or 7, wherein a distance between the adjacent pattern regions is 15 micrometers or less.

29. A single-sided one-sheet type capacitive touch screen, comprising:
 a substrate;
 a first conductive pattern disposed on the substrate in a vertical direction and comprising at least two pattern columns having electrically connected metal lines;
 a second conductive pattern which is disposed on the same surface as the surface where the first conductive pattern is disposed, is not electrically connected with the first conductive pattern, and comprises two or more metal lines not electrically connected with each other;
 a transparent conductive bridge electrically connecting the metal lines of the second conductive pattern in a horizontal direction; and
 a transparent insulating part disposed between the transparent conductive bridge and the first conductive pattern to electrically insulate the transparent conductive bridge and the first conductive pattern wherein the first conductive pattern and the second conductive pattern are a metallic pattern.

* * * * *